United States Patent [19]
Nawata et al.

[11] Patent Number: 6,112,615
[45] Date of Patent: Sep. 5, 2000

[54] VEHICLE PEDAL SUPPORTING STRUCTURE

[75] Inventors: Katsumi Nawata; Hiroshi Isono, both of Susono, Japan

[73] Assignee: Toyota Jidosha Kabushiki Kaisha, Toyota, Japan

[21] Appl. No.: 08/845,462

[22] Filed: Apr. 25, 1997

[30] Foreign Application Priority Data

Apr. 30, 1996 [JP] Japan ..................... 8-109774

[51] Int. Cl.$^7$ .............................. B60K 28/10; B60T 7/12; G05G 1/14
[52] U.S. Cl. ........................... 74/512; 180/274; 180/275; 280/784; 296/189
[58] Field of Search ............................. 74/512, 513, 560, 74/522, 561, 562; 180/274, 275; 280/784; 296/189

[56] References Cited

U.S. PATENT DOCUMENTS

| | | | |
|---|---|---|---|
| 2,869,392 | 1/1959 | Muller | 74/512 |
| 3,828,625 | 8/1974 | Bruhn | 74/512 |
| 5,327,797 | 7/1994 | Seifrit | 74/575 X |
| 5,460,061 | 10/1995 | Redding et al. | 74/513 X |
| 5,555,774 | 9/1996 | Lauring et al. | 74/560 X |
| 5,615,749 | 4/1997 | Kato | 180/274 |
| 5,848,662 | 12/1998 | Sakaue | 180/274 |

FOREIGN PATENT DOCUMENTS

| | | | |
|---|---|---|---|
| 92 16 500 U | 4/1993 | Germany. | |
| 4335511 A1 | 5/1994 | Germany | 74/512 |
| 9217184 U | 5/1994 | Germany | 74/512 |
| 195 15 852 A1 | 11/1995 | Germany. | |
| 195 17 604 A1 | 11/1995 | Germany. | |
| 55-175561 U | 6/1979 | Japan. | |
| 57-29459 U | 7/1980 | Japan. | |
| 1-73464 U | 5/1989 | Japan. | |
| 5-170065 | 7/1993 | Japan | 74/512 |
| 5-301565 | 11/1993 | Japan | 74/512 |
| 2031814 | 4/1980 | United Kingdom | 74/512 |

*Primary Examiner*—Vinh T. Luong
*Attorney, Agent, or Firm*—Oliff & Berridge, PLC

[57] ABSTRACT

A supporting structure of a pedal device for a vehicle is provided in which displacement of the stepping surface of the pedal device can be controlled at the time when an external force of a predetermined value or greater is applied from the front of the vehicle. An elongated hole whose longitudinal direction is a substantially longitudinal direction of the vehicle is formed at the intermediate portion of a pedal supporting portion. A clevis pin is inserted into the elongated hole at the front end portion thereof. A bush, which is away from the elongated hole due to the application of load, is mounted to the other remaining portion of the elongated hole. A bush stopper is provided at the rear side of the bush such that, when an external force of a predetermined value or greater is applied from the front of the vehicle, due to the bush stopper, the bush is away from the elongated hole. Therefore, the rearward movement of the clevis pin is enabled so that the distance between a dash panel and a connecting portion of a push rod and the pedal supporting portion can be made to be shorter than that before the application of the external force of a predetermined value or greater from the front of the vehicle. As a result, a pedal pad of a brake pedal can be displaced toward the front of the vehicle.

7 Claims, 16 Drawing Sheets

VEHICLE PEDAL SUPPORTING STRUCTURE

BACKGROUND OF THE INVENTION

1. Field of the Invention

The present invention relates to a supporting structure of a pedal device for a vehicle.

2. Description of the Related Art

Various conventional structures have been devised as countermeasures at the time that an external force of a predetermined value or greater is applied form the front of a vehicle. The structure disclosed in Japanese Utility Model Application Laid-Open (JP-U) No. 1-73464 will be described hereinafter as an example of such countermeasures.

As illustrated in FIG. 16, in the structure disclosed in JP-U No. 1-73464, a steering column 402 which covers a steering shaft 400 is supported at a vehicle body by a tilt bracket 408, which is formed from an upper plate member 404 and a pair of side plate members 406, and by a shaft 410, which passes through the side plate member 406 and supports the bottom end of the steering column 402.

A knee protector 412, which is shaped as a substantially circular arc shaped surface and is elastically deformable, is disposed at the lower side of the tilt bracket 408. The knee protector 412 is elastically supported at the lower side of the steering column 402 via elastically deformable stays 414.

In accordance with the above structure, when an external force of a predetermined value or greater is applied from the front of the vehicle, the vehicle occupant starts to inertially move toward the front of the vehicle, and accordingly, the knees of the vehicle occupant start to inertially move in the same direction while the legs of the vehicle occupant are bent with the knees as the point of bending. Therefore, if the knee protector 412 were not provided, the driver's knees might contact the tilt bracket 408. However, if the knee protector 412 is disposed beneath the tilt bracket 408 as described above, the driver's knees only contact with the knee protector 412.

This structure in which the knee protector 412 is provided is useful as a countermeasure at the time that an external force of a predetermined value or greater is applied from the front of the vehicle. However, countermeasures relating to the legs of the vehicle occupant can also be studied from other points of view or in many ways. For multilevel protection, it is important to provide multiple measures relating to occupant's legs.

The present inventors conceived of the idea of the present invention from this standpoint, conducted various experiments and arrived upon extremely effective countermeasures which control the displacement of a pedal device for a vehicle such as a brake pedal at the time that an external force of a predetermined value or greater is applied from the front of the vehicle, by focusing on the deformation and the displacement behavior of the body panel and the like at the time such an external force is applied.

SUMMARY OF THE INVENTION

Before a description of the present invention is given hereinafter, it should be noted that 'front' indicates the front direction of a vehicle, 'rear' indicates the rear direction of the vehicle, 'upper' indicates the upper direction of the vehicle, and 'lower' indicates the lower direction of the vehicle.

In view of the aforementioned, an object of the present invention is to provide a supporting structure of a pedal device for a vehicle which can control displacement of a stepping surface of the pedal device at the time when an external force of a predetermined value or greater is applied from the front of the vehicle.

A first aspect of the present invention is a supporting structure of a pedal device for a vehicle, comprising: a pedal bracket which is fixed to a vehicle body and supports a vicinity of an upper end portion of a suspended-type pedal device by rotatably supporting a rotating shaft member provided in the vicinity of the upper end portion of the suspended-type pedal device; operational force transmitting means which transmits, to a stepping force increasing means, a stepping force applied to a stepping surface of the pedal device, and which supports an intermediate portion of the pedal device by the operational force transmitting means being connected to the intermediate portion of the pedal device so as to be rotatable; displacement controlling means which, when an external force of a predetermined value or greater is applied to a front portion of a vehicle, moves a connecting portion of the operational force transmitting means and the pedal device substantially toward a rear portion of a vehicle with respect to the pedal device so that the displacement of the stepping surface of the pedal device can be controlled; and regulating means which regulates the direction of movement of the connecting portion to a predetermined direction.

A second aspect of the present invention is a supporting structure of a pedal device for a vehicle according to the first aspect, wherein the regulating means is constituted by an elongated hole which is provided in the vicinity of the intermediate portion of the pedal device and whose longitudinal direction is a substantially longitudinal direction of the vehicle.

A third aspect of the present invention is a supporting structure of a pedal device for a vehicle, comprising: a pedal bracket which is fixed to a vehicle body and supports a vicinity of an upper end portion of a suspended-type pedal device by rotatably supporting a rotating shaft member provided in the vicinity of the upper end portion of the suspended-type pedal device; operational force transmitting means which transmits, to a stepping force increasing means, a stepping force applied to a stepping surface of the pedal device, and which supports an intermediate portion of the pedal device by the operational force transmitting means being connected to the intermediate portion of the pedal device so as to be rotatable; displacement controlling means which, when an external force of a predetermined value or greater is applied to a front portion of a vehicle, changes a condition of the operational force transmitting means by contracting, deforming or dividing the same so that the displacement of the stepping surface of the pedal device can be controlled; and regulating means which regulates the direction of the change of condition of the operational force transmitting means to a predetermined direction.

A fourth aspect of the present invention is a supporting structure of a pedal device for a vehicle according to the third aspect, wherein the regulating means is constituted by the operational force transmitting means including a tube body and a shaft member which is connected to the tube body in a state in which a portion of the shaft member is inserted into the tube body, the shaft member (being) inserted into the tube body by the connecting state of the tube body and the shaft member being canceled at the time when an external force of a predetermined value or greater is applied to a front portion of the vehicle.

In accordance with the first aspect of the present invention, when an external force of a predetermined value or greater is applied to a front portion of the vehicle, the external force is transmitted to the connecting portion of the operational force transmitting means and a portion adjacent to the intermediate portion of the pedal device via the operational force transmitting means. In this case, in the present invention, the connecting portion of the operational force transmitting means and the portion adjacent to the intermediate portion of the pedal device is relatively moved substantially toward the rear of the vehicle with respect to the pedal device by the displacement controlling means. As a result, the distance between the stepping force increasing means, and the connecting portion of the operational force transmitting means and the pedal device (as seen apparently) is shorter than that before the application of the external force to the front of the vehicle so that the displacement of the stepping surface of the pedal device can be controlled.

Further, in accordance with the present invention, when the above-described connecting portion moves substantially toward the rear of the vehicle with respect to the pedal device, the direction of movement of the connecting portion is regulated by the regulating means to a predetermined direction. Accordingly, when the above-described connecting portion moves substantially toward the rear of the vehicle with respect to the pedal device, the connecting portion can be prevented from moving in a direction different from the direction in which the connecting portion is aiming to move.

In accordance with the second aspect of the present invention, since the regulating means is structured by the elongated hole which is provided adjacent to the intermediate portion of the pedal device and whose longitudinal direction is a substantially longitudinal direction of the vehicle, the direction of movement of the connecting portion is regulated to the substantially longitudinal direction of a vehicle which is the longitudinal direction of the elongated hole.

Further, because the regulating means is structured by the elongated hole which is provided adjacent to the intermediate portion of the pedal device, it is not need to secure a space near the operational force transmitting means.

In accordance with the third aspect of the present invention, when an external force of a predetermined value or greater is applied to a front portion of the vehicle, the external force is transmitted to the connecting portion of the operational force transmitting means and a portion adjacent to the intermediate portion of the pedal device via the operational force transmitting means. In this case, in the present invention, condition of the operational force transmitting means is changed by the same being contracted, deformed or divided by the displacement control means. As a result, the distance between the stepping force increasing means, and the connecting portion of the operational force transmitting means and the pedal device becomes shorter than that before the application of the external force to a front of the vehicle so that the displacement of the stepping surface force of the pedal device can be controlled.

Further, in accordance with the invention, when the condition of the operational force transmitting means is changed, the direction of modification of the operational force transmitting means is regulated to a predetermined direction by the regulating means. Accordingly, when the condition of the operational force transmitting means is changed, the operational force transmitting means is prevented from changing in a direction different from the direction in which the condition of the operational force transmitting means is aiming to change.

In accordance with the fourth aspect, when an external force of a predetermined value or greater is applied from the front of the vehicle, the connecting state of a tube body forming a portion of the operational force transmitting means and a shaft member forming the other portion thereof is canceled so that the shaft member is inserted into the tube portion. Accordingly, the distance between the stepping force increasing means, and the connecting portion of the operational force transmitting means and the pedal device becomes shorter than that before the application of the external force to a front of the vehicle. Further, when the shaft member is inserted into the tube portion, the direction of change of the condition of the operational force transmitting means is regulated to the axial direction of the tube body and the shaft member which are the elements constituting the operational force transmitting means.

Moreover, because the regulating means is constituted by the operational force transmitting means including the tube body and the shaft member, in a case in which the external force applied to the front of the vehicle is relatively small, the insertion amount of the shaft member into the tube body is thereby reduced. Conversely, in a case in which the external force applied to the front of the vehicle is relatively large, the insertion amount of the shaft member into the tube body is thereby increased.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS (Overall supplements for the embodiments)

As for the explanation of the embodiments as from the second embodiment, portions identical to those shown in the previous embodiment are denoted by the same reference numbers, and description therefor will be omitted.

In each of the embodiments which will be explained hereinafter, although the present invention aims to provide a suspended type brake pedal, it is not limited to this, and the present invention can be used for a suspended type of clutch pedal, a suspended type of parking brake pedal, or the like.

(A first embodiment)

A description of a first embodiment will be given hereinafter with reference to FIGS. 1 through 4.

Figure 1:
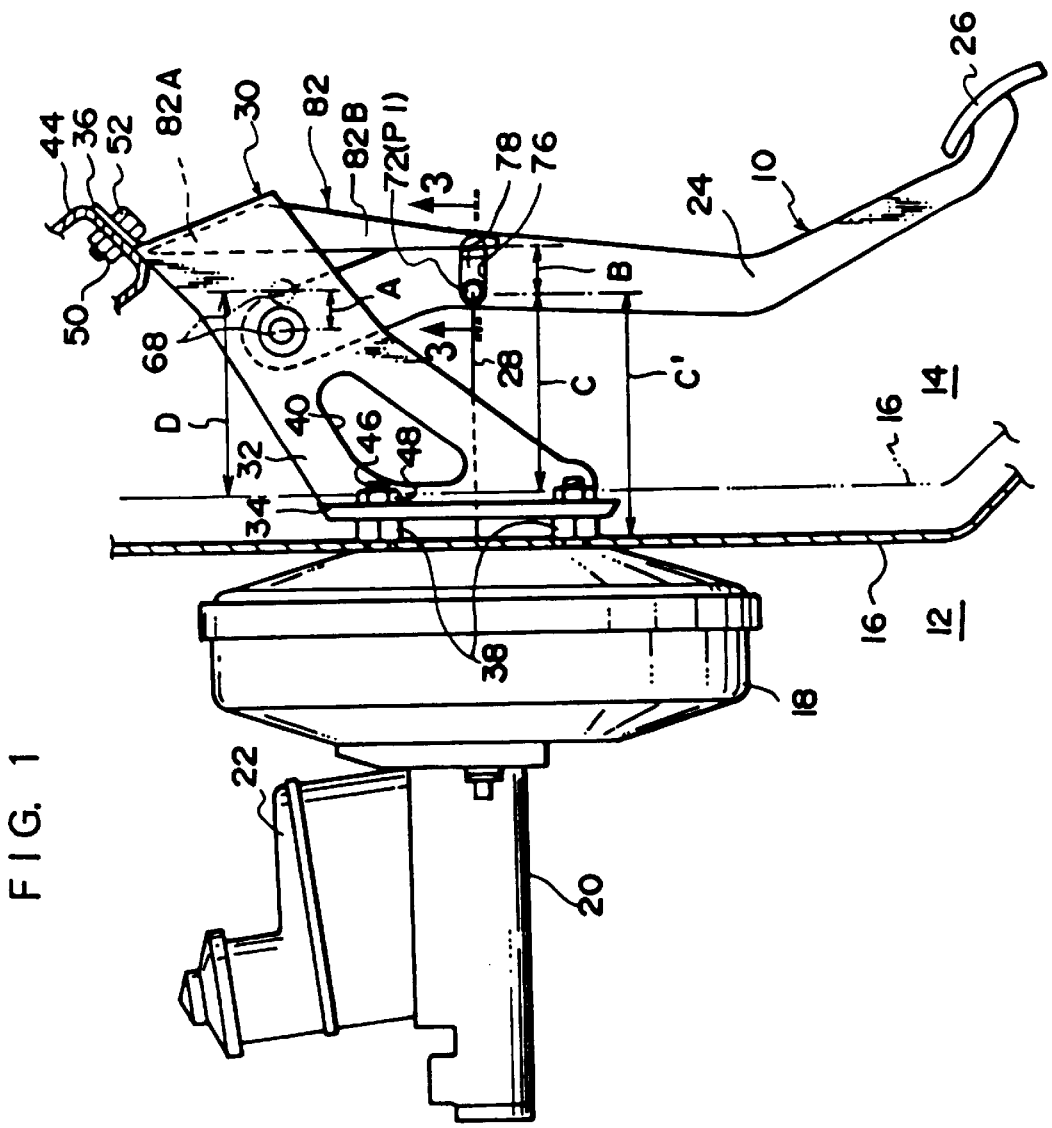
FIG. 1 is a side view illustrating a supporting structure of a pedal device for a vehicle relating to a first embodiment.
Figure 2:
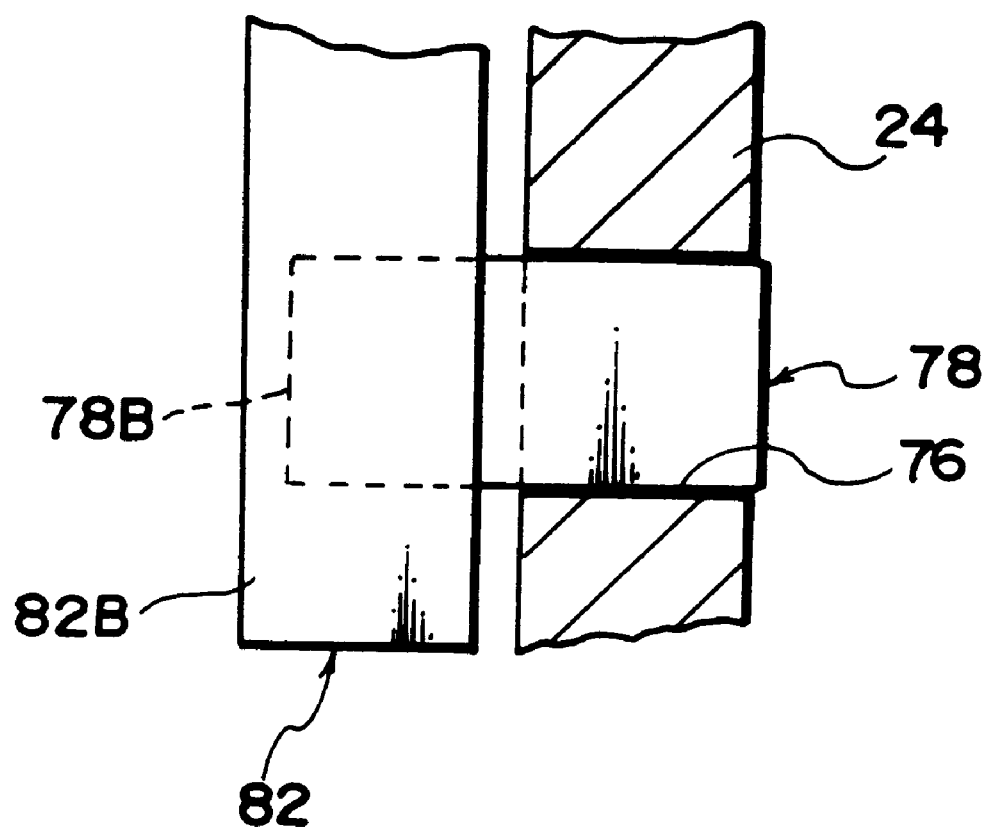
FIG. 2 is a longitudinal sectional view illustrating a vicinity of the rear end portion of an elongated hole of FIG. 1.

The structure of the periphery of a suspended type brake pedal 10 as viewed from a side surface is shown schematically in FIG. 1. As shown in the figure, the brake pedal 10, to which the stepping force of a driver is applied, is provided and a dash panel 16, which partitions an engine room 12 and a vehicle compartment interior space 14, is disposed substantially vertically at the side of the brake pedal 10 toward the front of the vehicle. A brake booster 18, a master cylinder 20, and a reservoir tank 22 are integrally disposed at the side of the dash panel 16 toward the front of the vehicle. The brake booster 18 increases the stepping force of the driver applied to the brake pedal 10. The master cylinder 20 converts the pressure increased by the brake booster 18 into hydraulic pressure. The reservoir tank 22 stores and replenishes brake fluid in accordance with changes in the volume of the hydraulic pressure system.

The brake pedal 10 includes a pedal supporting portion 24 and a pedal pad 26. The pedal supporting portion 24 is formed by appropriately bending a narrow plate member. The pedal pad 26 is provided at the lower portion of the pedal supporting portion 24, and the stepping force is applied to the pedal pad 26. A return spring (not shown) engages with the pedal supporting portion 24 of the brake pedal 10 so that the pedal supporting portion is always urged to return to its initial position.

Figure 3:
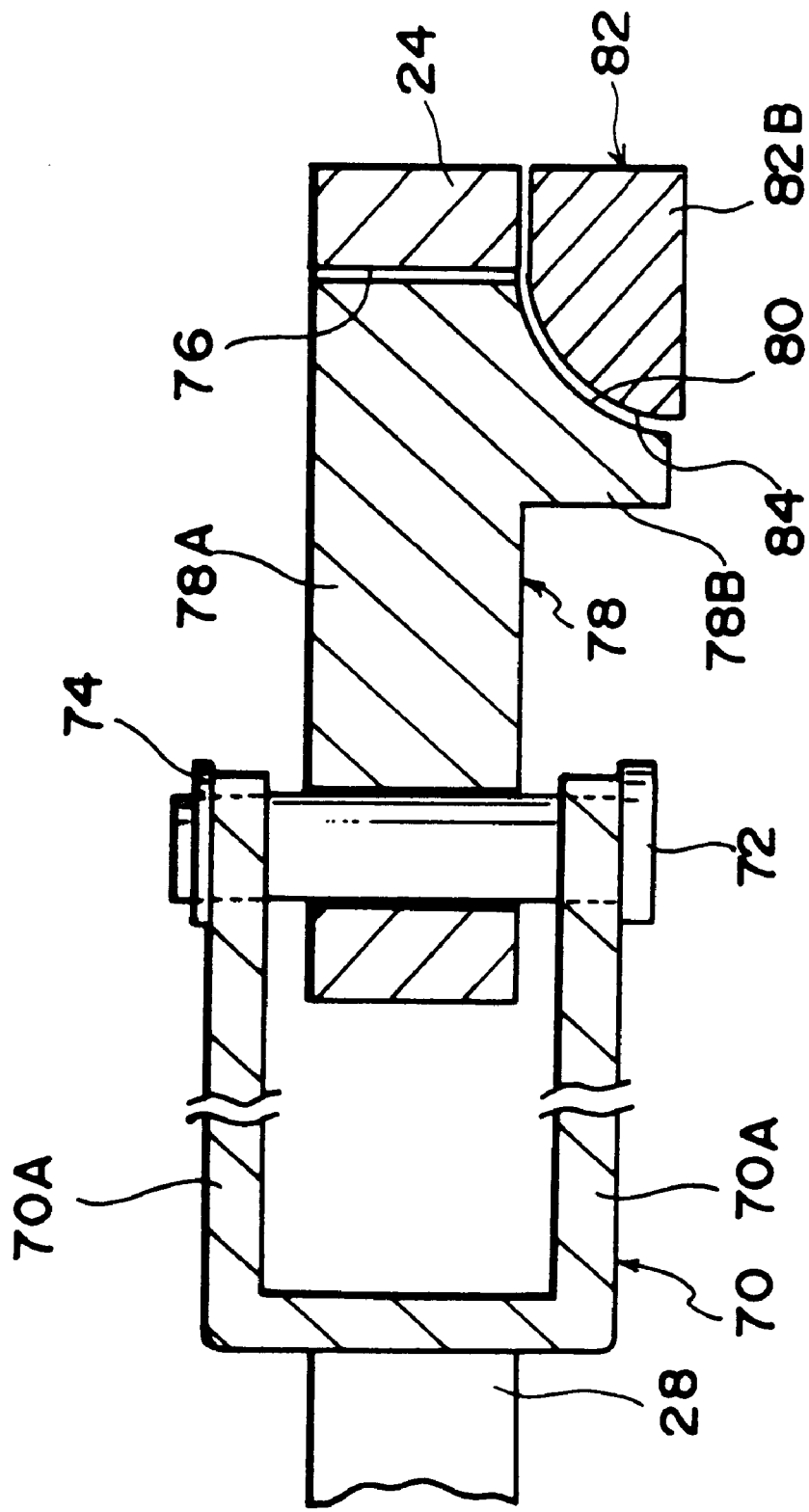
FIG. 3 is a horizontal sectional view illustrating the elongated hole taken along line 3—3 of FIG. 1 in a longitudinal direction thereof.

A distal end portion of a push rod (operating rod) 28, which projects from the brake booster 18 and passes through the dash panel 16, is connected to the intermediate portion of the pedal supporting portion 24 of the brake pedal 10 so as to be relatively and freely rotatable (in this figure, the connected portion of the push rod 28 and the pedal supporting portion 24 is indicated collectively by P1). More detailed structure of the connecting portion will be explained as below. As shown in FIG. 3, a clevis 70, which is formed in a substantially U-shape as seen from a plan view, is fixed to the distal end portion of the push rod 28. The intermediate portion of the pedal supporting portion 24 is provided between the distal end portions of the side portions 70A of the clevis 70 (the end portions of the clevis toward the rear of the vehicle) in an inserted state. In this state, a clevis pin 72 passes through the side portions 70A of the clevis 70 and the pedal supporting portion 24. An annular groove is formed at the peripheral surface of the end portion of the clevis pin 72, and an E-ring 74 is fitted into the annular groove so that the clevis pin 72 is prevented from falling off from the clevis 70 and the pedal supporting portion 24. Instead of the E-ring 74, β-pin can be used.

In accordance with the above-described structure, the intermediate portion of the pedal supporting portion 24 of the brake pedal 10 is supported by the push rod 28.

Figure 4:
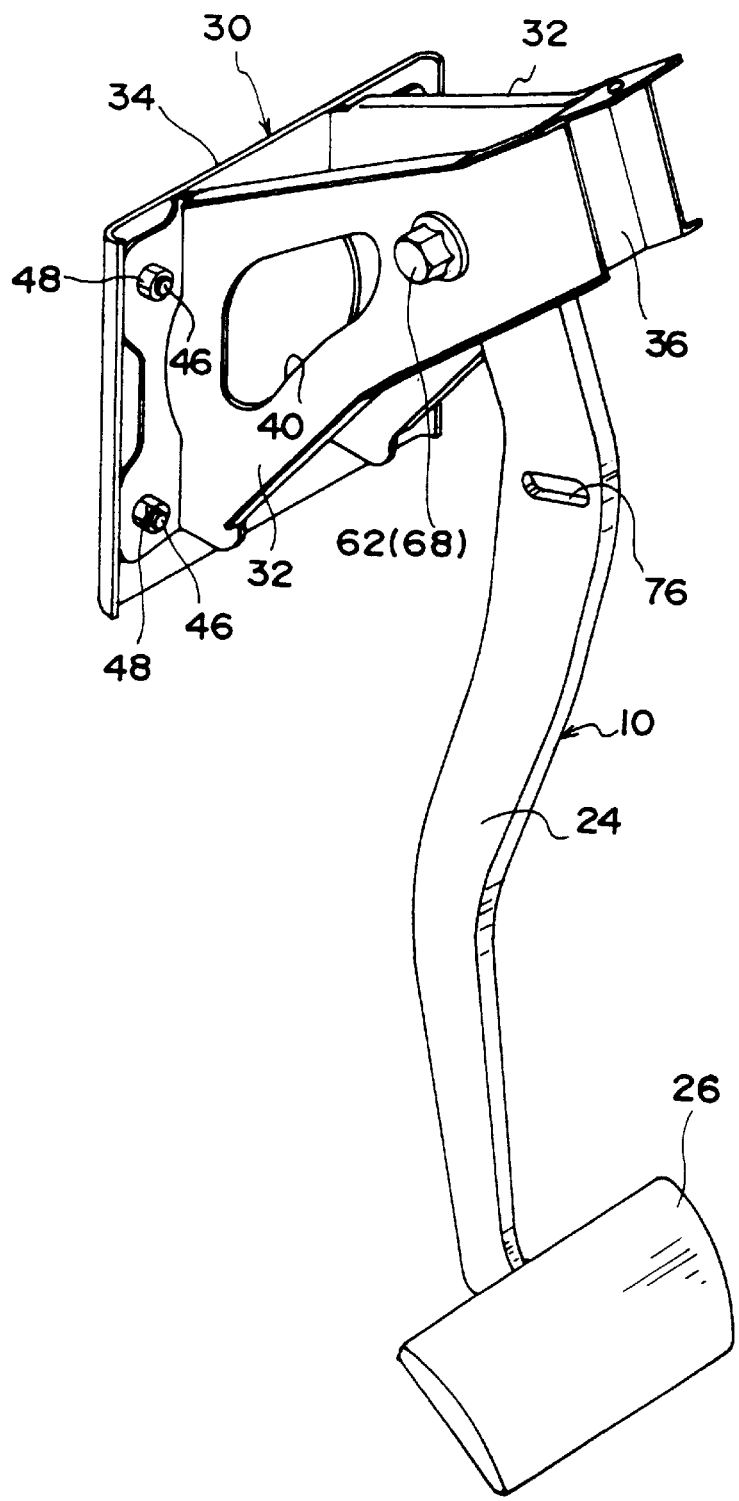
FIG. 4 is a perspective view focusing on a pedal bracket or the like in a supporting structure of a pedal device for a vehicle of FIG. 1 in an assembled state thereof.

Next, a supporting structure of the upper end portion of the pedal supporting portion 24 of the brake pedal 10 will be explained. As shown in FIG. 4, the upper end portion of the pedal supporting portion 24 of the brake pedal 10 is swingably supported by a pedal bracket 30. The pedal bracket 30 is structured by a pair of side plates 32, a base plate 34, and a rear plate 36. The pair of side plates 32 are disposed parallel to one another. The base plate 34 is connected to the front end portions of the side plates 32 and forms a mounting seat surface at the front side. The rear plate 36 is connected between the rear end portions of the side plates 32 and forms a mounting seat surface at the rear side. In plan view, the pedal bracket 30 has a substantially rectangular frame shape. A plurality of pipe-like collars 38 (see FIG. 1) are fixed in advance to predetermined portions at the front surface side of the base plate 34. A substantially triangular hole 40, for tuning the rigidity of the side plates in the longitudinal direction, is formed in the front portion of each side plate 32. Further, as a method for tuning the rigidity of the side plates 32 in the longitudinal direction, other than the above-described method using the hole 40, a method or the like in which an entire thickness of each side plate is made thinner, or a reinforcing member such as a flange or the like is provided so as to locally generate a concentration of stress at a desired portion/desired portions of each side plate.

The pedal bracket 30 having the above-described structure is assembled to the vehicle body in such a manner that the base plate 34 is fixed to the dash panel 16 and the rear plate 36 of the pedal bracket 30 is fixed to a bracket 44 which is provided at the vehicle body. The bracket 44 at the vehicle body is fixed to a reinforcing member at the vehicle body which may be a cowl inner panel, which connects the left and right front pillars, or an instrument panel reinforcement, which is disposed along the transverse direction of the vehicle. More specifically, in a state in which the respective collars 38 are pushed against the dash panel 16, stud bolts 46 projecting from the brake booster 18 are inserted into the collars 38. In this state, by screwing nuts 48 with the stud bolts 46, the base plate 34 of the pedal bracket 30 is fixed to the dash panel 16. A dash insulator (not shown) serving as a sound insulator is interposed between the dash panel 16 and the base plate 34. Alternatively, weld nuts may be welded in advance to the surface at the front side of the dash panel 16, and mounting bolts may be screwed into the weld nuts from the base plate 34 side. The upper end portion of the rear plate 36 is bent toward the rear of the vehicle. In a state in which this bent portion is abutted against the bracket 44 at the vehicle body, the rear plate 36 of the pedal bracket 30 is fixed to the bracket 44 at the vehicle body by a mounting bolt 52 being screwed with a weld nut 50 of the bracket 44 at the vehicle body.

The pedal bracket 30 having the above-described structure is assembled to the dash panel 16 and the bracket 44 at the vehicle body. A rotating shaft member 68, which passes through the upper end portion of the pedal supporting portion 24 of the brake pedal 10, is disposed between the pair of side plates 32 of the pedal bracket 30 so as to be rotatably supported. An example of the structure of the rotating shaft member 68 is briefly described, hereinafter. A cylindrical pedal boss is disposed so as to penetrate through a through hole which is formed at the upper end portion of the pedal supporting portion 24. After cylindrical-shaped bushes have been fitted onto the end portions of the pedal boss, cylindrical colloars are inserted into both bushes. Thereafter, a washer faced bolt 62 is inserted from outside of one of the side plates 32 and a nut is screwed onto the washer faced bolt 62 from outside of the other side plate 32. In this way, the rotating shaft member 68 is formed.

In accordance with the above-described structure, the upper end portion of the pedal supporting portion 24 of the brake pedal 10 is supported by the pedal bracket 30.

Here, in the present first embodiment, a structure which any displacement of the pedal pad 26 of the brake pedal 10 can be controlled will be explained as well. In this structure, when an external force of a predetermined value or greater is applied to a front portion of the vehicle, the clevis pin 72 serving as the connecting portion, of the push rod 28 and the pedal supporting portion 24 of the brake pedal 10, relatively moves substantially toward the rear of the vehicle with respect to the pedal supporting portion 24 of the brake pedal 10 so that the displacement of the pedal pad 26 of the brake pedal 10 can be arbitrarily controlled.

As shown in FIGS. 1 through 4 (especially FIG. 3), an elongated hole 76 whose longitudinal direction is a substantially longitudinal direction of the vehicle, is formed at the intermediate portion of the pedal supporting portion 24 of the brake pedal 10. The clevis pin 72 is disposed so as to penetrate through the front end portion of the elongated hole 76. Further, a bush 78 is fitted in the elongated hole 76 between the clevis pin 72 and the rear end portion of the elongated hole 76. The bush 78 is comprised of a base portion 78A which is disposed so as to be fitted into the elongated hole 76, and a projecting portion 78B which projects from the side portion of the rear end side of the base portion 78A to an exterior space portion of the vehicle compartment (as the vehicle of the present embodiment is a left hand drive car, the vehicle compartment exterior space portion is a lower direction in FIG. 3). A concave surface portion 80, which is formed in a predetermined curved-shape, is provided at the rear end portion of the projecting portion 78B. The bush 78 is made from a resilient material such as a rubber, resin or metal having a predetermined hardness.

Moreover, a bush stopper 82 is disposed at the rear side of the concave surface portion 80 of the bush 78. The bush stopper 82 is formed in a vertically elongated wedge shape as seen in side view and is fixed to the rear plate 36 or the side plates 32, of the pedal bracket 30 at the upper end portion 82A of the bush stopper 82 (see FIG. 1). The lower end portion 82B of the bush stopper 82 is disposed at the rear side of the concave surface portion 80. A convex surface portion 84 having a predetermined curved surface shape, which corresponds to the configuration of the concave surface portion 80 of the bush 78, is formed at the front end portion of the lower end portion 82B of the bush stopper 82.

Next, the operation and the effects of the present embodiment will be described hereinafter.

When the vehicle is traveling normally, the brake pedal 10 is maintained at its initial position due to the urging force of the return spring. In this state, when a driver applies the stepping force to the pedal pad 26 of the brake pedal 10, the brake pedal 10 swings substantially toward the front of the vehicle around the rotating shaft member 68, the push rod 28 is pressed in the same direction, and the stepping force is increased by the brake booster 18. Further, when the brake pedal 10 is operating normally, load applied from the clevis pin 72 to the bush 78 is not enough to resiliently deform the bush 78. Accordingly, the operational feeling of the brake pedal 10 is not affected adversely by the load as well.

On the other hand, when an external force of a predetermined value or greater is applied from the front of the vehicle and the dash panel 16 is displaced rearward as indicated by a two-dotted line in FIG. 1, the pair of side plates 32 of the pedal bracket 30 are buckled in the longitudinal direction of a vehicle, accordingly. More specifically, the pedal bracket 30 is assembled by the base plate 34 being fixed to the dash panel 16 and the rear plate 36 being fixed to the bracket 44 at the vehicle body which is fixed to a reinforcing member at the vehicle body. Further, the holes 40 are formed in the pair of side plates 32 in order to decrease the rigidity of the side plates in the longitudinal direction. Therefore, when an external force of a predetermined value or greater is applied from the front of the vehicle and the dash panel 16 is displaced rearward, load toward the rear of the vehicle is input to the side plates 32 from the base plate 34, and a reaction force toward the front of the vehicle is input to the side plates 32 from the rear plate 36. Therefore, the side plates buckle substantially toward the rear of the vehicle (in the longitudinal direction). Accordingly, the rotating shaft member 68 is also displaced substantially toward the rear of the vehicle by A , i.e., a certain amount of displacement (see FIG. 1).

Conversely, when the dash panel 16 is displaced rearward, rearward displacement of the brake booster 18 fixed to the dash panel 16 follows so that load toward the rear of the vehicle is applied to the clevis pin 72, i.e., a connecting portion of the push rod 28 and the pedal supporting portion 24. Therefore, the pedal supporting portion 24 is pressed substantially rearward of the vehicle, and the concave surface portion 80 of the projecting portion 78B of the bush 78 is pressed at the convex surface portion 84 of the lower end portion 82B of the bush stopper 82. Accordingly, a component force toward an inner side of the vehicle compartment (the upper side of FIG. 3) is applied to the bush 78 so that the bush 78 is away from the elongated hole 76 of the pedal supporting portion 24. Therefore, the clevis pin 72 moves along the longitudinal direction of the elongated hole 76 and is positioned at the rear end portion of the elongated hole 76.

Here, since the clevis pin 72 moves along the elongated hole 76 substantially toward the rear of the vehicle, the amount of movement of the clevis pin 72 toward the rear of the vehicle is indicated by B. However, since the clevis pin 72 merely moves within the elongated hole 76, the pedal supporting portion 24 per se does not relatively move apparently. Namely, the connecting portion of the push rod 28 and the pedal supporting portion 24 does not move rearward apparently. For this reason, the distance C between the dash panel 16 after its rearward displacement and the connecting portion of the push rod 28 and the pedal supporting portion 24 is shorter than the distance C' between the dash panel 16 before its rearward displacement and the above connecting portion. In addition to this, as described above, because the rotating shaft member 68 is displaced toward the rear of the vehicle, rotating force substantially toward the front of the vehicle is applied to the pedal pad 26 of the brake pedal 10 around the connecting point (P1), and the pedal pad 26 is displaced substantially toward the front of the vehicle. From a viewpoint of displacing the pedal pad 26 effectively substantially toward the front of the vehicle, it is desirable to determine the longitudinal direction length of the elongated hole 76 or the like so that the above-described distance C becomes shorter than the distance D between the dash panel 16 after its rearward displacement and the rotating shaft member 68 after its rearward displacement.

In this way, in the present embodiment, a pin inserting hole, which is provided at the intermediate portion of the pedal supporting portion 24 and into which the clevis pin 72 is inserted, is used as the elongated hole 76 whose longitudinal direction is the longitudinal direction of the vehicle. The clevis pin 72 is disposed at the front end portion of the elongated hole 76. The bush 78, which is away from the elongated hole 76 due to load which is generated at the time when an external force of a predetermined value or greater is applied from the front of the vehicle, engages with the other portion (excluding the clevis pin 72) of the elongated hole 76. Accordingly, at the time of application of the external force from the front, the pedal pad 26 of the brake pedal 10 can be displaced substantially toward the front of the vehicle. In other words, in accordance with the present embodiment, when an external force of a predetermined value or greater is applied from the front of the vehicle, load which is applied to the connecting portion of the push rod 28 and the pedal supporting portion 24 is used to effect a control such that the pedal pad 26 of the brake pedal 10 is displaced substantially toward the front of the vehicle. As a result, bending of the driver's knee, which is caused by the inertial movement of the driver at the time when an external force of a predetermined value or greater is applied from the front of the vehicle, can be suppressed so that the driver's knee can be kept away from the steering column.

Further, in the present embodiment, the elongated hole 76 whose longitudinal direction is the longitudinal direction of the vehicle is formed in the pedal supporting portion 24 of the brake pedal 10. Since the elongated hole 76 regulates the direction of movement of the clevis pin 72 to a substantially longitudinal direction of the vehicle which is the longitudinal direction of the elongated hole 76, the clevis pin 72 is prevented from moving away from the above-described longitudinal direction. As a result, the pedal pad 26 can be displaced effectively toward the front of the vehicle so that reliability of the operation for controlling the displacement of the pedal pad 26 can be improved.

In accordance with the present embodiment, it is structured such that the clevis pin 72 is caused to move along the elongated hole 76 provided in the pedal supporting portion 24 at the time when an external force of a predetermined value or greater is applied from the front of the vehicle. Accordingly, it is not necessary to obtain a space near the push rod 28 as compared with a structure which will be described later and in which the push rod deforms at the time when the external force is applied from the front of the vehicle or the like.

The above elongated hole 76, the bush 78 and the bush stopper 82 correspond to "displacement control means" in the first aspect of the present invention and the elongated hole 76 corresponds to "regulating means" in the same.

(A second embodiment)

Next, a description of the second embodiment will be given with reference to FIG. 5.

Figure 5:
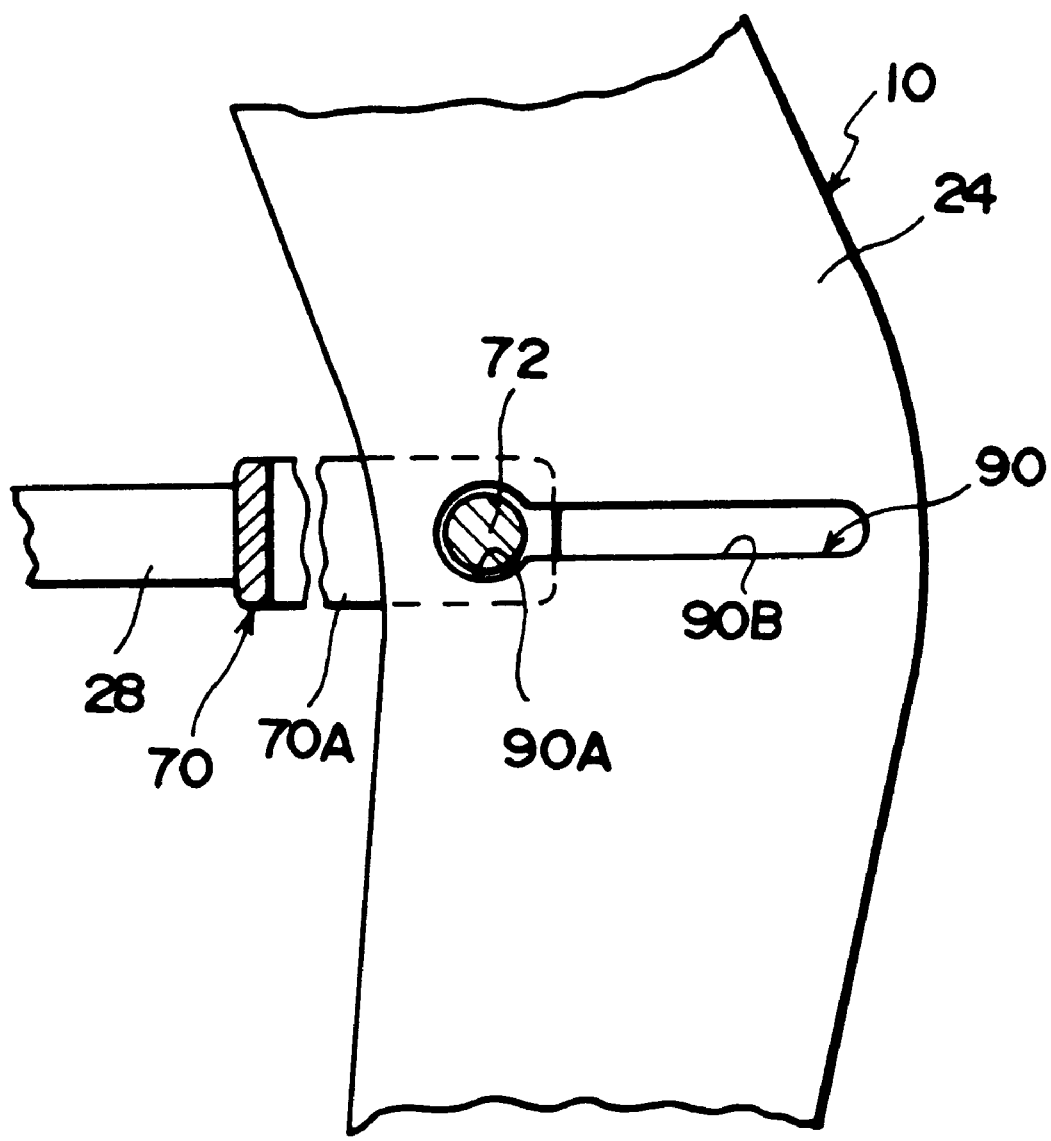
FIG. 5 is an enlarged side view illustrating principal portions of a supporting structure of a pedal device for a vehicle according to a second embodiment.

As shown in FIG. 5, the present embodiment is the same as the first embodiment in that an elongated hole 90 whose longitudinal direction is the longitudinal direction of the vehicle is formed at the intermediate portion of the pedal supporting portion 24. However, the elongated hole 90 of the present embodiment includes a large diameter portion 90A which is provided at the front end portion of the elongated hole 90 and whose diameter is slightly larger than that of the clevis pin 72, and a narrow portion 90B which extends from the large diameter portion 90A substantially rearward of the vehicle and whose diameter is slightly narrower than that of the clevis pin 72. In this respect, the structure of the elongated hole 90 of the present embodiment is different from that of the elongated hole 76 of the first embodiment.

In accordance with the above-described structure, before the time that an external force of a predetermined value or greater is applied from the front of the vehicle, the clevis pin 72 cannot enter into the narrow portion 90B of the elongated hole 90 and is held within the large diameter portion 90A of the elongated hole 90.

On the other hand, when an external force of a predetermined value or greater is applied from the front of the vehicle, load substantially toward the rear of the vehicle is applied from the push rod 28 to the clevis pin 72 by the same operation as that of the first embodiment. For this reason, the clevis pin 72 forcibly passes through the narrow portion 90B of the elongated hole 90 so as to be moved toward the rear of the vehicle, and the clevis pin 72 is thereby positioned at the rear end portion of the elongated hole 90. Accordingly, in the same manner as the first embodiment, also in the present embodiment, when an external force of a predetermined value or greater is applied from the front of the vehicle, the distance between the dash panel 16 after its rearward displacement and the connecting portion of the push rod 28 and the pedal supporting portion 24, can be made to be shorter apparently. As a result, rotating force substantially toward the front of the vehicle is applied to the pedal pad 26 of the brake pedal 10 around the connecting point (P1), and the pedal pad 26 can be displaced substantially toward the front of the vehicle so that the driver's knee can be kept away from the steering column.

Further, in the present embodiment, the elongated holes 90 whose longitudinal direction is the longitudinal direction of the vehicle is formed in the pedal supporting portion 24 of the brake pedal 10 so as to regulate the direction of movement of the clevis pin 72 to a substantially longitudinal direction of the vehicle which is the longitudinal direction of the elongated hole 90. Accordingly, in the same manner as the first embodiment, it is enabled to displace the pedal pad 20 effectively toward the front of the vehicle, and reliability of the operation for controlling the displacement of the pedal pad 26 can be improved.

Further, in accordance with the present embodiment, because it becomes unnecessary to use the push stopper 82 used in the first embodiment, the structure of the present embodiment can be simplified.

In order to obtain the above-described operations and effects, it is desired that the narrow portion 90B of the elongated hole 90 does not plastically deform at the strength of less than 1500N, while it plastically deforms at the strength of more than or equal to 1500N.

The entire portion of the elongated hole 90 including the large diameter portion 90A and the narrow portion 90B corresponds to "displacement control means" in the first aspect of the present invention, and the narrow portion 90B, which regulates the direction of movement of the clevis pin 72 therein, while being torn off, corresponds to "regulating means" in the same.

(A third embodiment)

Next, a description of the third embodiment will be described with respect to FIGS. 6 through 8.

Figure 6:
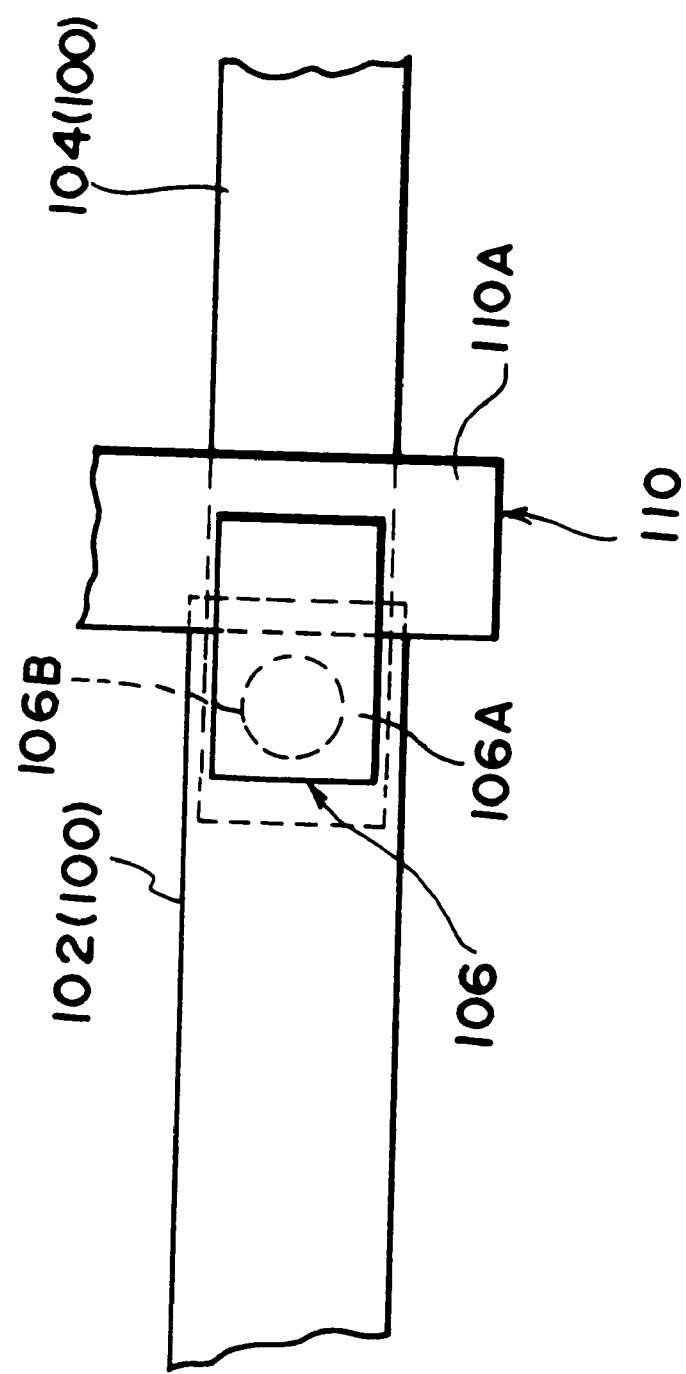
FIG. 6 is an enlarged side view illustrating principal portions of a supporting structure of a pedal device for a vehicle according to a third embodiment.
Figure 7:
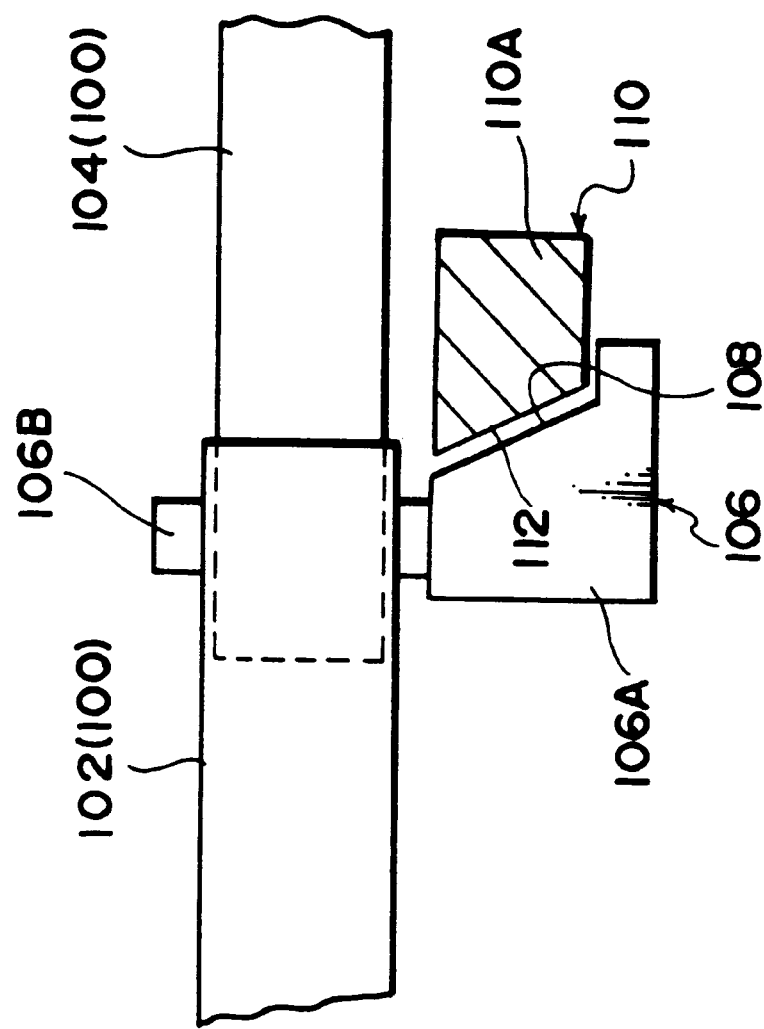
FIG. 7 is a plan view illustrating the principal portions of FIG. 6.
Figure 8:
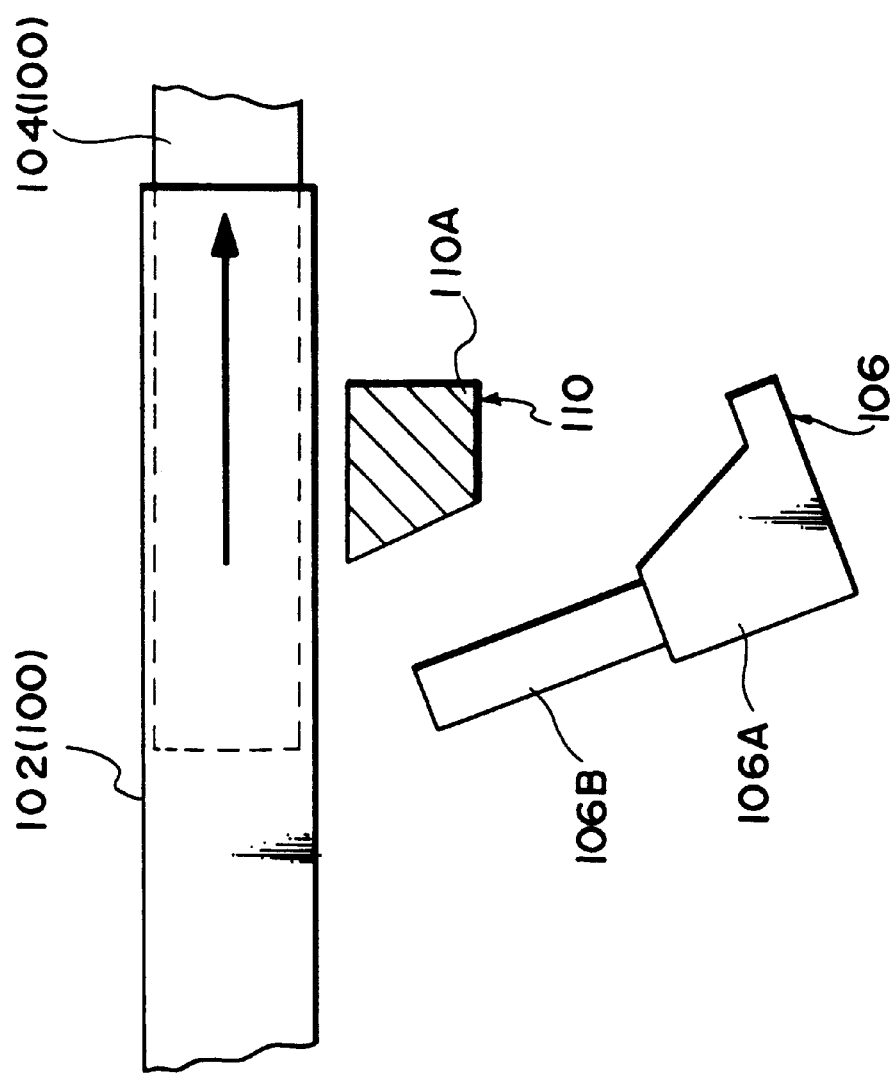
FIG. 8 is a plan view corresponding to FIG. 7 and illustrating a state in the structure of FIG. 6 at the time when an external force of a predetermined value or greater is applied from the front of the vehicle.

As shown in FIGS. 6 and 7, in the present embodiment, a push rod 100 is divided into a push rod outer 102 and a push rod inner 104. The push rod outer 102 and the push rod inner 104 are disposed so as to be coaxial with each other, and the inner diameter of the former is made to be slightly larger than the outer diameter of the latter.

The front end portion of the push rod inner 104 is inserted into the rear end portion of the push rod outer 102. A connecting pin 106 is inserted into a through hole which is formed coaxially at the push rod inner 104 and the push rod outer 102, respectively in a state in which the push rod outer 102 and the push rod inner 104 overlap with each other. The connecting pin 106 includes a substantially trapezoidal body portion 106A as seen in plan view and an engaging portion 106B which projects from the body portion 106. Further, a tapered surface 108 is provided at the rear side of the body portion 106A of the connecting pin 106.

A lower end portion 110A of a pin stopper 110 is disposed at the rear side of the above connecting pin 106. The upper end portion of the pin stopper 110 is fixed to the rear plate 36 or the side plates 32, of the pedal bracket 30. A tapered surface 112 having an inclined angle, which is the same as the tapered surface 108 of the connecting pin 106, is formed at the lower end portion 110A of the pin stopper 110 at the front of the vehicle. The tapered surface 108 and the tapered surface 112 are disposed so as to face one another.

In accordance with the above structure, in a state before the time when an external force of a predetermined value or greater is applied from the front of the vehicle, the push rod outer 102 and the push rod inner 104 are connected by the connecting pin 106, and the push rod 100 has an ordinary length.

On the other hand, when an external force of a predetermined value or greater is applied from the front of the vehicle, the push rod 100 is pressed substantially toward the rear of the vehicle, and the body portion 106A of the connecting pin 106 is thereby abutted against the pin stopper 110. Therefore, the tapered surface 108 of the body portion 106A of the connecting pin 106 is pressed to the tapered surface 112 of the pin stopper 110, and a component force toward the exterior of the vehicle compartment (in the lower direction of FIG. 7) is applied to the body portion 106A of the connecting pin 106. Accordingly, as shown in FIG. 8, the connecting pin 106 falls off from the connecting portion of the push rod outer 102 and the push rod inner 104 so that the front end portion of the push rod inner 104 moves along the push rod outer 102 and is inserted into the rear end portion of the push rod outer 102. Namely, in this case, the push rod 100 becomes shorter than the push rod 100 before an external force of a predetermined value or greater is applied from the front of the vehicle. Therefore, the distance between the dash panel 16 after its rearward displacement, and the connecting portion of the push rod 100 and the pedal supporting portion 2 (position of the clevis pin 72) becomes shorter as well. As a result, rotating force substantially toward the front of the vehicle is applied to the pedal pad 26 of the brake pedal 10 around the connecting point (P1), and the pedal pad 26 is displaced substantially toward the front of the vehicle so that the driver's knee can be kept away from the steering column.

Each of the above-described first and second embodiments is structured such that the elongated hole 76 is formed in the pedal supporting portion 24. Accordingly, an absorbing stroke which absorbs the load which is applied to the clevis pin 72, i.e., the connecting portion of the push rod 100 and the pedal supporting portion 24 at the time when an external force of a predetermined value or greater is applied from the front of the vehicle, is limited by the longitudinal direction length of the elongated hole 76, i.e., the width of the pedal supporting portion 24 in the longitudinal direction of the vehicle. Conversely, in the present third embodiment, the push rod 100 is divided into the push rod outer 102 and the push rod outer 104, which are connected by the connecting pin 100. When an external force of a predetermined value or greater is applied from the front of the vehicle, the push rod 100 is supposed to be contracted. Accordingly, the present embodiment is excellent in that an absorbing stroke (travel), which absorbs the load which is applied to the clevis pin 72 at the time of the application of the external force, is not limited by the width of the pedal supporting portion 24 in the longitudinal direction of the vehicle. More specifically, in the present embodiment, the amount of contraction of the push rod 100 can be increased/decreased in accordance with magnitude of the load at the time of the application of the external force, and accordingly, the load applied to the clevis pin 72 at the time of the application of the external force can be reduced. Accordingly, a holding performance, which holds the clevis pin 72 at a position where the clevis pin 72 is disposed before the application of an external force of a predetermined value or greater from the front of the vehicle, can be improved by the above-described amount of the load which is decreased. This also means that the pedal pad 26 can be displaced largely toward the front of the vehicle especially in a case in which the amount of movement of the rotating shaft member 68 is added thereto.

Further, in accordance with the present embodiment, since the front end portion of the push rod inner 104 is inserted into the rear end portion of the push rod outer 102 by the push rod inner 104 moving along the push rod outer 102, the direction of contraction of the push rod 100 can be regulated by the push rod outer 102 to the axial direction thereof. Accordingly, the pedal pad 26 can be displaced effectively toward the front of the vehicle so that reliability of the operation for controlling the displacement of the pedal pad 26 can be improved.

In the present embodiment, since the push rod 100 is contracted at the time of the application of an external force from the front of the vehicle, it is significant in that no space is needed near the push rod 100 as compared with a structure in which the push rod is deformed or the like at the time of the application of the external force, which will be described later.

The above-described push rod outer 102, the push rod inner 104, the connecting pin 106 and the pin stopper 108 correspond to "displacement control means" in the third aspect of the present invention, and the push rod outer 102 of these elements corresponds to "regulating means" in the same.

(A fourth embodiment)

Figure 9:
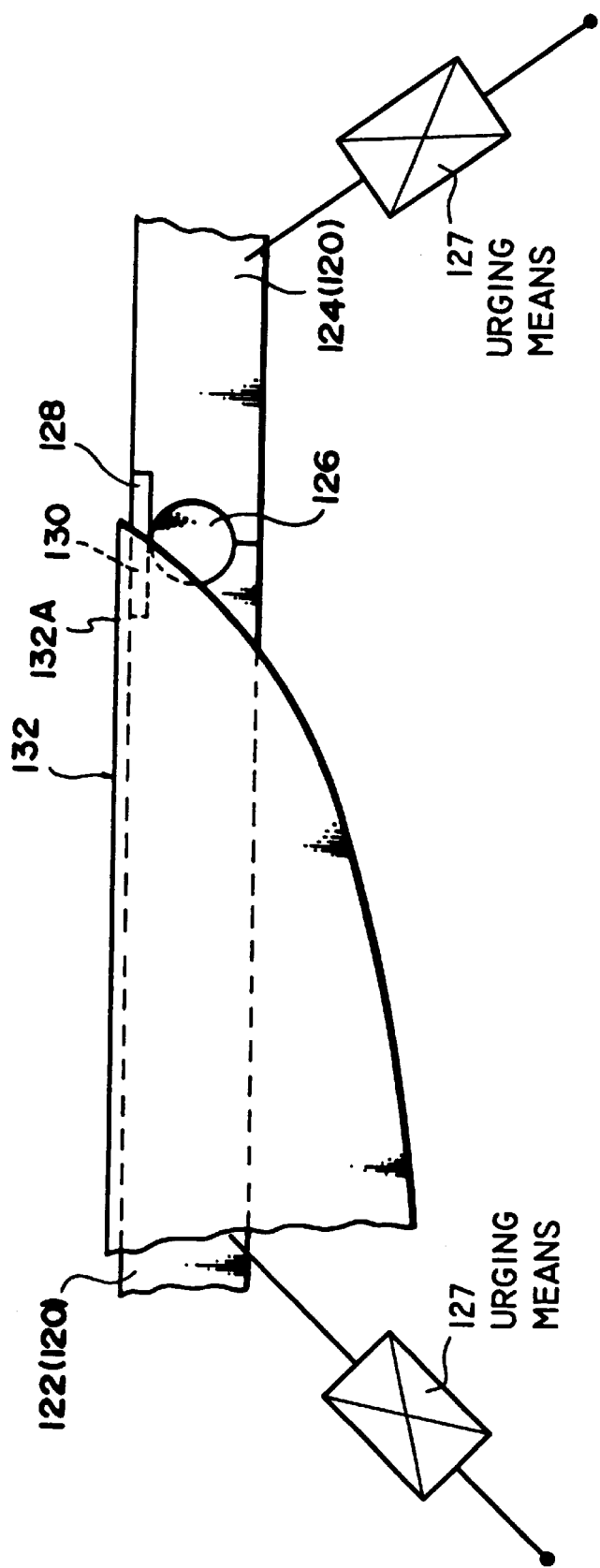
FIG. 9 is an enlarged side view illustrating principal portions of a supporting structure of a pedal device for a vehicle according to a fourth embodiment.
Figure 10:
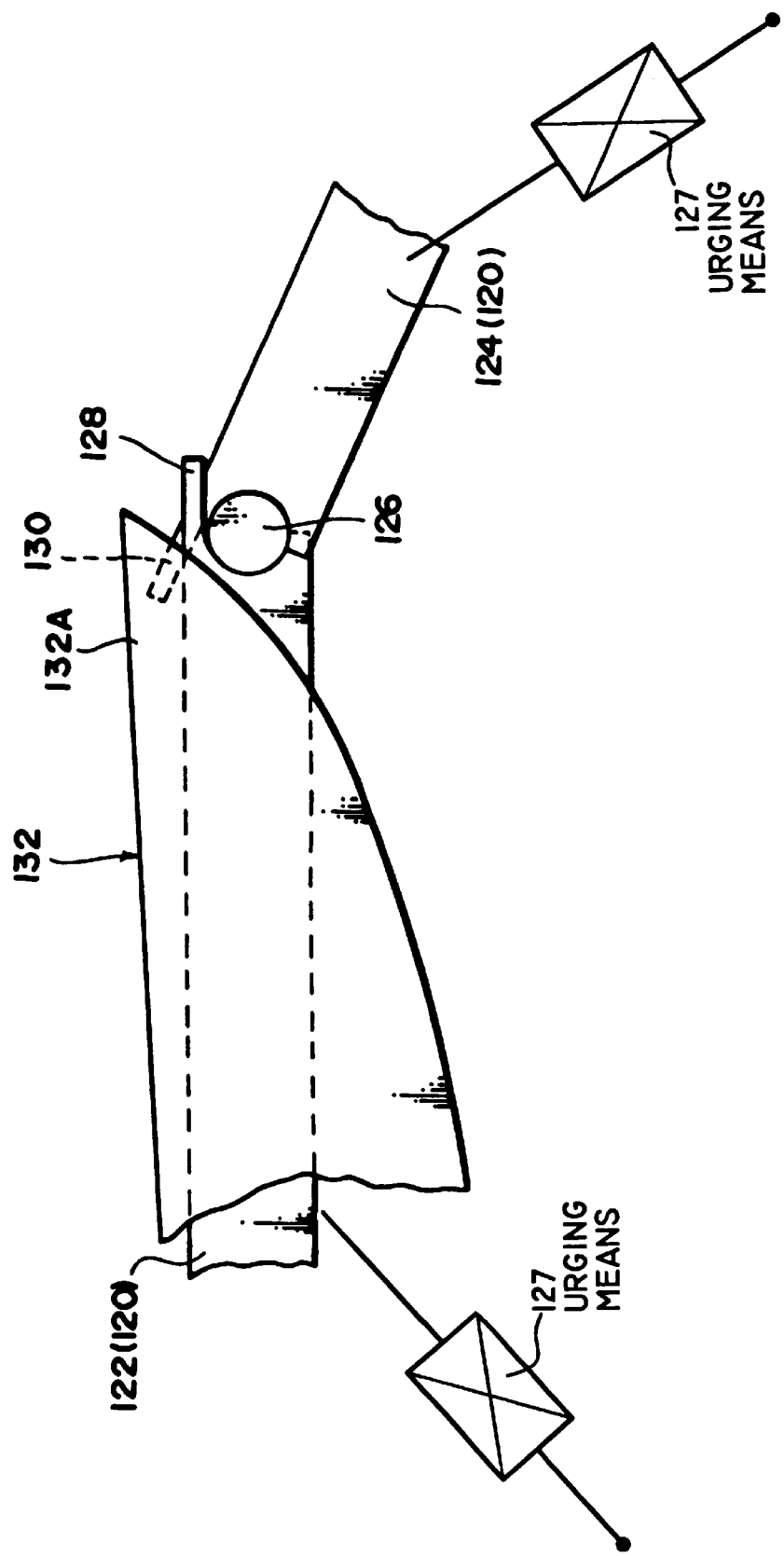
FIG. 10 is an enlarged side view corresponding to FIG. 9 and illustrating a state in the structure of FIG. 9 at the time when an external force of a predetermined value or greater is applied from the front of the vehicle.

Next, a description of the fourth embodiment will be given with reference to FIGS. 9 and 10.

As shown in these figures, the present embodiment is structured in the same way as the third embodiment in that a push rod 120 is divided into a front side rod 122 and a rear side rod 124. However, the present embodiment is different from the third embodiment in that diameters of the front side rod 122 and the rear side rod 124 are the same, and the rear end portion of the front side rod 122 and the front end portion of the rear side rod 124 are hinge-joined by a hinge pin 126. Further, pawl portions 128 and 130 are integrally formed at respective uppermost portions of the rear end portion of the front side rod 122 and the front end portion of the rear side rod 124, and project in a direction in which the pawl portions 128 and 130 intersect with each other.

Moreover, a push rod guide 132 is provided at the outer peripheral surface of the rear end portion of the front side rod 122, and bends along the outer peripheral surface of the push rod 120. The front end portion of the push rod guide 132 is fixed to the base plate 34 of the pedal bracket 30 such that the rear end portion 132A of the push rod guide 132 presses the pawl portion 128 of the front side rod 122 and the pawl portion 130 of the rear side rod 124 from the upper direction thereof.

In accordance with the above structure, in a state before the time at which an external force of a predetermined value or greater is applied from the front of the vehicle, the pawl portion 128 of the front side rod 122 and the pawl portion 130 of the rear side rod 124 are suppressed by the rear end portion 132A of the push rod guide 132 from the upper direction thereof, and are flush with each other so as to form the push rod 120 linearly with the ordinary length.

On the other hand, when an external force of a predetermined value or greater is applied from the front of the vehicle, the push rod 120 is pressed substantially rearward of the vehicle. Accordingly, as shown in FIG. 10, the front side rod 122 and the rear side rod 124 bend upwardly by using a hinge pin 126, which connects the front side rod 122 and the rear side rod 124, as a starting point. At this time, the rear end portion 132A of the push rod guide 132 bends upwardly as well. Accordingly, the distance between the dash panel 16 after its rearward displacement, and the connecting portion (the position of the clevis pin) of the push rod 120 and the pedal supporting portion 24 becomes shorter than that before the application of an external force of a predetermined value or greater from the front of the vehicle. As a result, rotating force substantially toward the front of the vehicle is applied to the pedal pad 26 of the brake pedal 10 around the connecting point (P1), and the pedal pad 26 is displaced substantially toward the front of the vehicle so that the driver's knee can be kept away from the steering column.

For the same reason as that in the aforementioned fourth embodiment, in the present embodiment, it is significant in that an absorbing stroke for absorbing the load which is applied to the clevis pin 72 at the time of the application of an external force of a predetermined value or greater from the front of the vehicle, is not limited to the width of the pedal supporting portion 24 in the longitudinal direction of the vehicle, and the pedal pad 26 can be displaced largely toward the front of the vehicle.

Further, because the present embodiment is structured such that the front side rod 122 and the rear side rod 124 are connected by the hinge pin 126, when the front side rod 122 and the rear side rod 124 bend around the hinge pin 126, a force which withdraws the clevis pin 72 substantially toward the front of the vehicle is applied to the clevis pin 72 via the rear side rod 124. For this reason, the pedal pad 26 can be displaced more largely toward the front of the vehicle.

Further, as described above, in the present embodiment, each of the pawl portions 128 and 130 is formed at the respective upper edge portions of the front side rod 122 so as to be suppressed by the push rod guide 132. Accordingly, when the front side rod 122 and the rear side rod 124 bend around the hinge pin 126 as described above, they can absolutely be bent upwardly. In this sense, it is possible to regulate the direction of bending of the push rod 120 around the hinge pin 126 so that the pedal pad 26 can be displaced effectively toward the front of the vehicle. As a result, reliability of the operation for controlling the displacement of the pedal pad 26 can be improved.

Moreover, in the present embodiment, when an external force of a predetermined value or greater is applied from the front of the vehicle, the front side rod 122 and the rear side rod 124 bend upwardly around the hinge pin 126. However, the present invention is not limited to this, and it is possible to bend the front side rod 122 and the rear side rod 124 downwardly by using the hinge pin 126 as a starting point at the time of the application of the external force.

Further, when urging means 127 such as a tension coil spring or the like engages with each of the lower edge portions of the rear side rod 124 and the front side rod 122 (urging means can be also engaged with each of the lower edge portions of the rear side rod 124 and the lower edge portion of the push rod guide 132. In this case, a spiral spring or the like is convenient) so as to bend the push rod 120, a relatively large amount of withdrawing force toward the front of the vehicle can be applied to the clevis pin 72 via the rear side rod 124.

The aforementioned front side rod 122, the rear side rod 124, the hinge pin 126, the pawl portions 128, 130, and the push rod guide 132 correspond to "displacement control means" in the third aspect of the present invention, and the pawl portions 128, 130 and the push rod guide 132 of these component elements correspond to "regulating means" in the same aspect.

(A fifth embodiment)

Next, the fifth embodiment of the present invention is described with reference to FIGS. 11 through 13.

Figure 11:
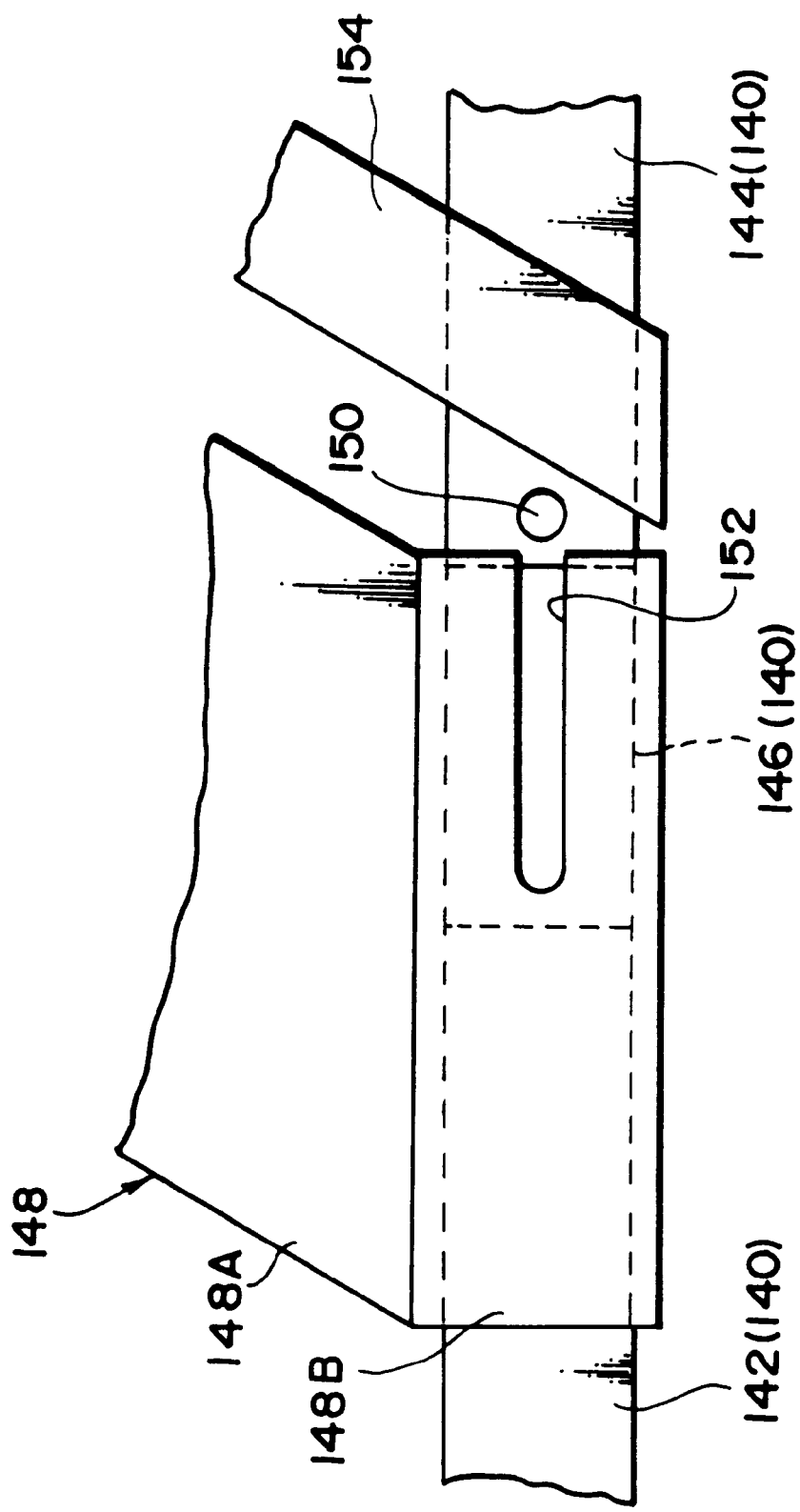
FIG. 11 is an enlarged side view illustrating principal portions of a supporting structure of a pedal device for a vehicle according to a fifth embodiment.
Figure 12:
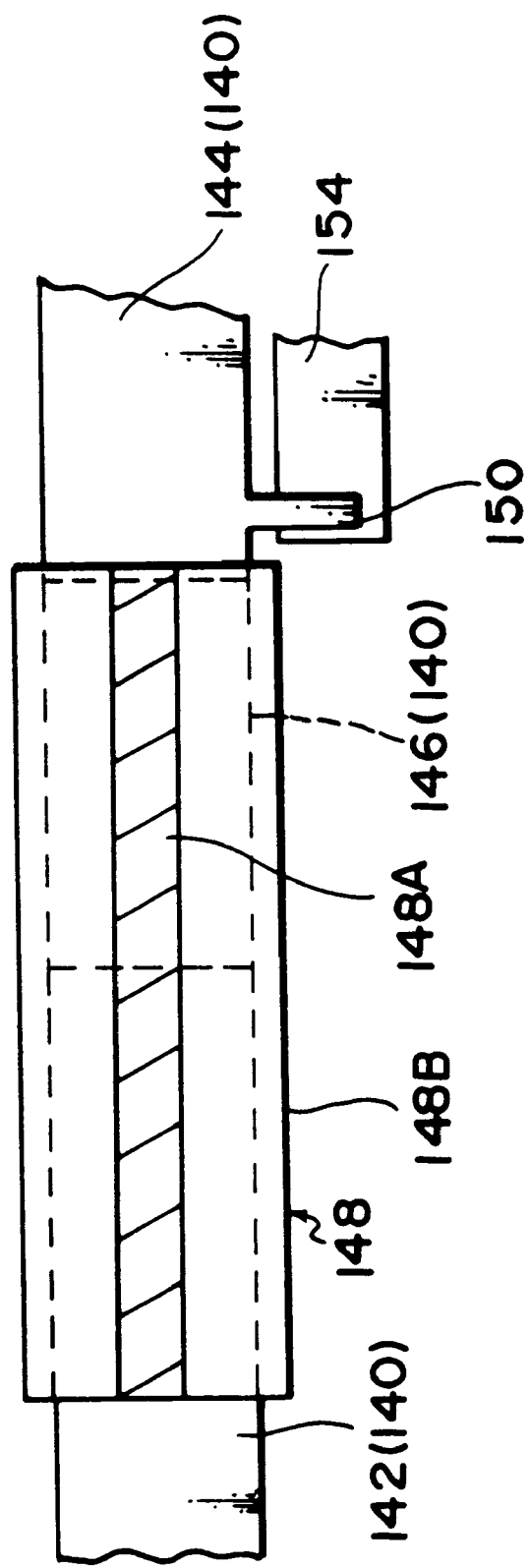
FIG. 12 is a plan view which illustrates the principal portions of FIG. 11 and includes a partial section thereof.

As shown in FIGS. 11 and 12, in the present embodiment, a push rod 140 is divided into a front side rod 142, a rear side rod 144 and an intermediate rod 146 which is interposed between the front side rod 142 and the rear side rod 144. The front side rod 142, the rear side rod 144 and the intermediate rod 146 have the same diameter and are disposed so as to be coaxial with each other.

A holding plate 148 is mounted to the rear plate 36 of the pedal bracket 30. The holding plate 148 comprises a plate-shaped base portion 148A and a tube portion 148B. The plate-shaped base portion 148A is fixed to the rear plate 36 or the side plates 32, of the pedal bracket 30. The tube portion 148B is provided at the lower end portion of the base portion 148A, and the inner diameter of the tube portion 148B is larger than the outer diameter of the push rod 140. In a state in which the rear end portion of the front side rod 142, the intermediate rod 146 and a portion of the front end portion of the rear side rod 144 are inserted into the tube portion 148B, the front side rod 142, the intermediate rod 146 and the rear side rod 144 are held so as to be coaxial with each other.

Further, a pin 150 is provided so as to project from the front end portion of the side surface of the rear side rod 144 in a direction orthogonal to the direction of the axis line of the push rod 140. A slit 152 is formed at a predetermined position of the rear end portion of the tube portion 148B of the holding plate 148 so as to correspond to the pin 150, and extends in parallel to the axis line of the push rod 140. A plate-shaped pin stopper 154 is disposed at the side of the pin 150 toward the rear of the vehicle. The pin stopper 154 inclines rearward of the vehicle at a predetermined angle with respect to the line of the pin 150 along the vertical direction of the vehicle. Moreover, the upper end portion of the pin stopper 154 is fixed to the rear plate 36 or the side plates 32, of the pedal bracket 30.

In accordance with the above-described structure, in a state before the time that an external force of a predetermined value or greater is applied from the front of the vehicle, the front side rod 142, the rear side rod 144 and the intermediate rod 146 are held by the tube portion 148B of the holding plate 148 so as to be coaxial with each other.

Accordingly, the push rod 140 can maintain its linear configuration and has the ordinary length. When the driver is stepping on the brake pedal 10, the pin 150 is entered into the slit 152 so that the driver can effect the operation of the brake pedal smoothly.

On the other hand, when an external force of a predetermined value or greater is applied from the front of the vehicle, the push rod 140 is pressed substantially toward the rear of the vehicle so that the rear side rod 144 is pushed out of the tube portion 148B of the holding plate 148. Therefore, as shown in FIG. 13, the pin 150 projecting from the rear side rod 144 abuts a front end inclining surface of the pin stopper 154 (i.e., a guide surface) and slides upwardly therealong. Therefore, the intermediate rod 146 is pressed rearwardly by the front side rod 142 so as to fall off from the tube portion 148B of the holding plate 148. In this way, the distance between the dash panel 16 after its rearward displacement and the connecting portion of the push rod 140 and the pedal supporting portion 24 (the position of the clevis pin 72) becomes shorter than that before the application of an external force of a predetermined value or greater from the front of the vehicle. As a result, rotating force substantially toward the front of the vehicle is applied to the pedal pad 26 of the brake pedal 10 around the connecting point (P1), the pedal pad 26 is displaced substantially toward the front of the vehicle so that the driver's knee can be kept away from the steering column.

For the same reason as that of the aforementioned fourth embodiment, the present embodiment is excellent in that an absorbing stroke which absorbs load, which is applied to the clevis pin 72 at the time of the application of an external force of a predetermined value or greater from the front of the vehicle, is not limited to the width of the pedal supporting portion 24 in the longitudinal direction of the vehicle, and the pedal pad 26 can be largely displaced substantially toward the front of the vehicle.

Figure 13:
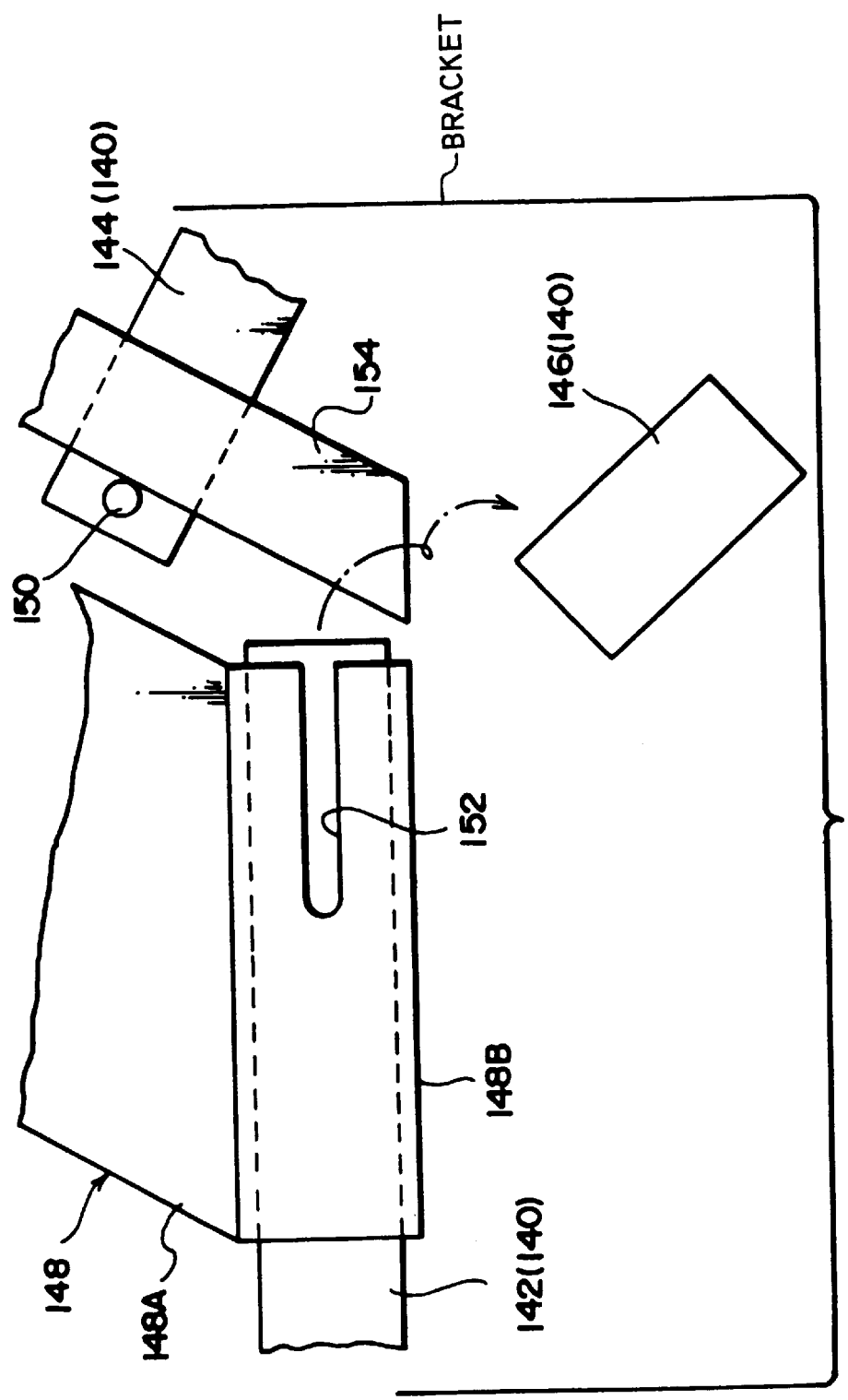
FIG. 13 is an enlarged side view corresponding to FIG. 11 and illustrating a state in the structure of FIG. 11 at the time when an external force of a predetermined value or greater is applied from the front of the vehicle.

Further, as shown in FIG. 13, since the present embodiment is structured such that, when an external force of a predetermined value or greater is applied from the front of the vehicle, the pin 150 of the rear side rod 144 slides upwardly along the front end inclined surface of the pin stopper 154, rotating force substantially toward the front of the vehicle can be applied to the clevis pin 72 via the rear side rod 144. Therefore, the pedal pad 26 can be displaced more largely toward the front of the vehicle.

Moreover, in the present embodiment, when the rear side rod 144 is pressed substantially toward the rear of the vehicle via the front side rod 142, direction of movement of the rear side rod 144 can be regulated to the upper direction thereof by the pin stopper 154, and the pedal pad 26 can be displaced effectively substantially toward the front of the vehicle can be carried out effectively. As a result, reliability of the operation for controlling the displacement of the pedal pad 26 can be improved.

The aforementioned front side rod 142, the rear side rod 144, the intermediate rod 146, the holding plate 148, and the pin 150 correspond to "displacement control means" in the third aspect of the present invention, and the pin 150 and the pin stopper 154 correspond to "regulating means" in the same.

(A sixth embodiment)

Figure 14:
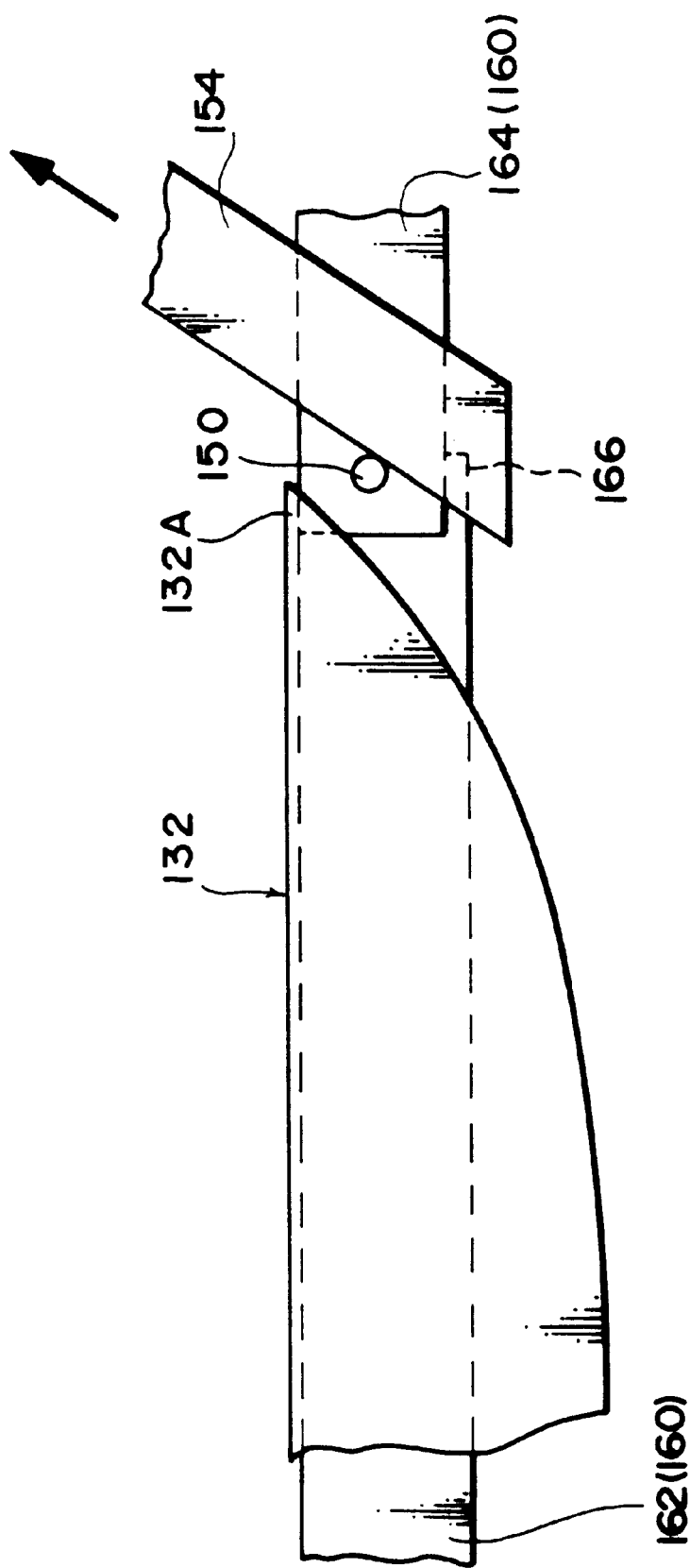
FIG. 14 is an enlarged side view illustrating principal portions of a supporting structure of a pedal device for a vehicle according to a sixth embodiment.
Figure 15:
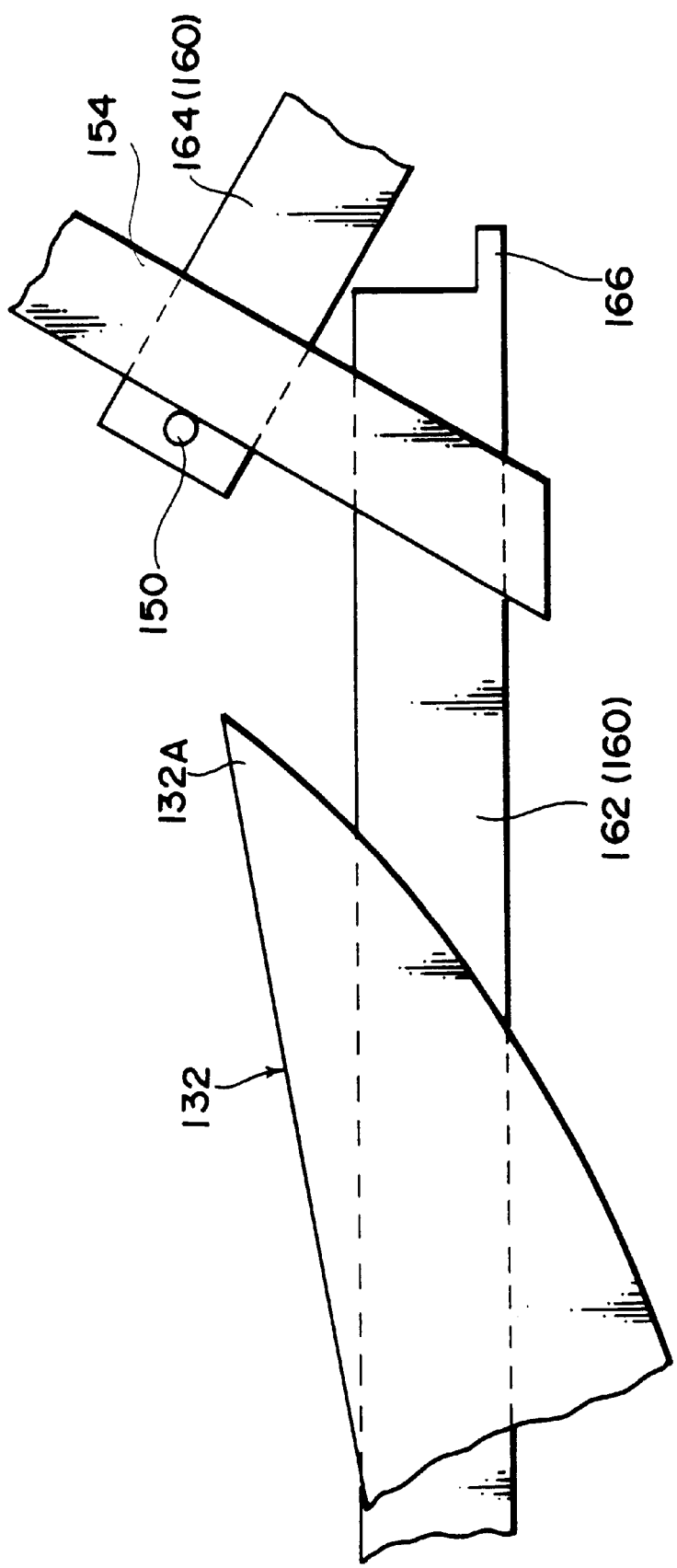
FIG. 15 is an enlarged side view corresponding to FIG. 14 and illustrating a state in the structure of FIG. 14 at the time when an external force of a predetermined value or greater is applied from the front of the vehicle.
Figure 16:
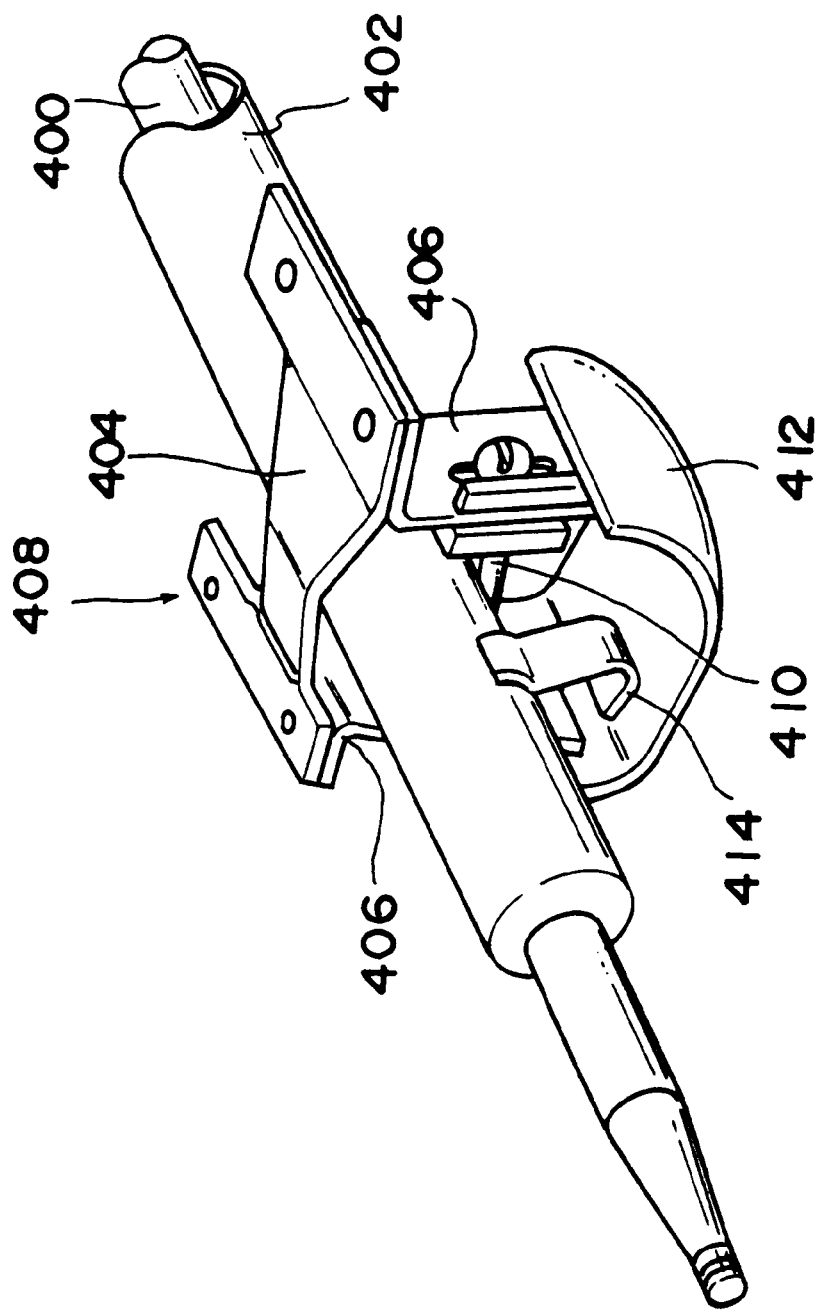
FIG. 16 is a perspective view of a supporting structure of a pedal device for a vehicle in the related art.

Next, the sixth embodiment will be described with reference to FIGS. 14 and 15.

As shown in these figures, the present embodiment is structured in the same way as the four th embodiment in that a push rod 160 is divided into a front side rod 162 and a rear side rod 164, and the connecting portion of the front side rod 162 and the rear side rod 164 is suppressed by the rear end portion 132A of the push rod guide 132 from the upper direction thereof. The diameter of the front side rod 162 is made to be larger than that of the rear side rod 164. A pawl portion 166 is projected from the lower edge portion of the rear end portion of the front side rod 162 so as to clamp the front end portion of the rear side rod 164 together with the rear end portion 132A of the push rod guide 132.

The pin 150, which is used in the aforementioned fifth embodiment as well, is provided at the side surface of the rear end portion of the rear side rod 164 in a direction orthogonal to the direction of the axis line. A plate-shaped pin stopper 154 is provided at the rear side of the pin 150 so as to correspond to the pin 150.

In accordance with the above structure, in a state before the time that an external force of a predetermined value or greater is applied from the front of the vehicle, the front side rod 162 and the rear side rod 164 are held by the push rod guide 132 and the pawl portion 166 so as to be coaxial with each other, so that the push rod 160 maintains its linear configuration and has an ordinary length.

When an external force of a predetermined value or greater is applied from the front of the vehicle, the push rod 160 is pressed rearward of the vehicle. Accordingly, as shown in FIG. 15, the pin 150 projecting from the rear side rod 164 abuts a front end inclining surface of the pin stopper 154 and slides upwardly therealong. For this reason, the rear side rod 164 is away from the front side rod 162, and the rear end portion of the push rod guide 132 bends upwardly. Therefore, the distance between the dash panel 16 after its rearward displacement and the connecting portion of the push rod 160 and the pedal supporting portion 24 (the position of the clevis pin 72) becomes shorter than that before the application of an external force of a predetermined value or greater from the front of the vehicle. As a result, rotating force substantially toward the front of the vehicle is applied to the pedal pad 26 of the brake pedal 10 around the connecting point (P1), the pedal pad 26 can be displaced toward the front of the vehicle, and the driver's knee can be kept away from the steering column.

For the same reason as that in the aforementioned fourth embodiment, the present embodiment is excellent in that an absorbing stroke for absorbing load, which is applied to the clevis pin 72 when an external force of a predetermined value or greater is applied from the front of the vehicle, is not limited to the width of the pedal supporting portion 24 in the longitudinal direction of the vehicle, and the pedal pad 26 can be largely displaced substantially toward the front of the vehicle.

Further, in the present embodiment, for the same reason as that in the above fifth embodiment, the pedal pad 26 can be disposed more positively toward the front of the vehicle as well.

Moreover, in the same manner as the aforementioned fifth embodiment, when the rear side rod 164 is pressed toward the front of the vehicle via the front side rod 162, the direction of movement of the rear side rod 164 can be regulated to the upper direction thereof with the pin stopper 154. Due to this, the pedal pad 26 can be displaced effectively toward the front of the vehicle. In this way, reliability of the operation for controlling the displacement of the pedal pad 26 can be improved.

The aforementioned push rod guide 132, the pawl portion 166, the front side rod 162 and the rear side rod 164 correspond to "displacement control means" in the third aspect of the present invention, and the pin 150 and the pin stopper 154 correspond to "regulating means" in the same.

What is claimed is:

1. A supporting structure of a suspended-type pedal device for a vehicle, the supporting structure comprising:

a pedal bracket which is fixed to a vehicle body and supports a vicinity of an upper end portion of the suspended-type pedal device by rotatably supporting a rotating shaft member provided in the vicinity of the upper end portion of the suspended-type pedal device;

stepping force increasing means for increasing a stepping force applied to a stepping surface of the suspended-type pedal device;

operational force transmitting means for transmitting the stepping force applied to the stepping surface of the suspended-type pedal device by the stepping force transmitting means, the operational force transmitting means including a connecting portion connected to an intermediate portion of the suspended-type pedal device and the stepping force increasing means, the connecting portion transmitting the stepping force applied to the stepping surface of the suspended-type pedal device to the stepping force increasing means, the connecting portion supports the intermediate portion of the suspended-type pedal device so the suspended-type pedal device is rotatable relative to the rotating shaft member;

displacement controlling means moving the connecting portion and the suspended-type pedal device rearward relative to a portion fixed to the bracket of the vehicle when an external force of a predetermined value or greater is applied to a front portion of the vehicle such that displacement of the stepping surface of the suspended-type pedal device is controlled; and regulating means for regulating a direction of movement of the connecting portion to a predetermined direction.

2. A supporting structure of a suspended-type pedal device for a vehicle, the supporting structure comprising:

a pedal bracket which is fixed to a vehicle body and supports a vicinity of an upper end portion of the suspended-type pedal device by rotatably supporting a rotating shaft member provided in the vicinity of the upper end portion of the suspended-type pedal device;

stepping force increasing means for increasing a stepping force applied to a stepping surface of the suspended-type pedal device:

operational force transmitting means for transmitting the stepping force applied to the stepping surface of the suspended-type pedal device by the stepping force transmitting means, the operational force transmitting means including a connecting portion connected to an intermediate portion of the suspended-type pedal device and the stepping force increasing means, the connecting portion transmitting the stepping force applied to the stepping surface of the suspended-type pedal device to the stepping force increasing means, the connecting portion supports the intermediate portion of the suspended-type pedal device so the suspended-type pedal device is rotatable relative to the rotating shaft member;

displacement controlling means deforming the operational force transmitting means when an external force of a predetermined value or greater is applied to a front portion of the vehicle such that displacement of the stepping surface of the suspended-type pedal device is controlled; and regulating means for regulating the deforming the operational force transmitting means to a predetermined condition.

3. The supporting structure according to claim 2, wherein the operational force transmitting means comprises a front side rod and a rear side rod joined by a hinge pin, the front side rod and the rear side rod are formed with pawl portions that permit the front side rod and the rear side rod to rotate relative to the hinge pin in a predetermined direction; and a rod guide disposed at a peripheral surface of a rear end portion of the front side rod to maintain a coaxial relationship of the front side rod and the rear side rod during a normal state, the rod guide permitting the front side rod and the rear side rod to rotate relative to the hinge pin when the external force of the front portion of the vehicle, in which the displacement controlling means is comprised of the front side rod, the rear side rod, the hinge pin, the pawl portions and the rod guide, and the regulating means is comprised of the pawl portions and the rod guide.

4. The supporting structure according to claim 3, wherein the front side rod and the rear side rod bend upwardly relative to the hinge pin when the external force of the predetermined value or greater is applied to the front portion of the vehicle.

5. The supporting structure according to claim 4, further comprising:

urging means engaging a lower edge portion of the rear side rod, the urging means positively bending the front side rod and the rear side rod upwardly relative to the hinge pin when the external force of the predetermined value or greater is applied to the front portion of the vehicle.

6. The supporting structure according to claim 2, further comprising:

buckling means provided at the pedal bracket, the buckling means buckling the pedal bracket when the external force of the predetermined value or greater is applied to the front portion of the vehicle such that the rotating shaft member moves rearward relative to the vehicle.

7. The supporting structure according to claim 2, wherein the stepping force increasing means is a brake booster and the operational force transmitting means is a push rod comprising the front side rod and the rear side rod, the push rod extending from the brake booster.

* * * * *